United States Patent
Numakura et al.

[11] Patent Number: 5,841,897
[45] Date of Patent: Nov. 24, 1998

[54] METHOD FOR THE TONAL CONTROL OR ADJUSTMENT OF REPRODUCED COLOR IMAGE AND PICTURE PRODUCING SYSTEM MAKING USE OF SAID METHOD

[75] Inventors: Takashi Numakura; Iwao Numakura, both of Tokyo; Susumu Kitazawa, Kanagawa-ken, all of Japan

[73] Assignee: Yamatoya & Co., Ltd., Tokyo, Japan

[21] Appl. No.: 651,607

[22] Filed: May 22, 1996

[30] Foreign Application Priority Data

May 23, 1995 [JP] Japan ...................................... 7-146935
Jul. 12, 1995 [JP] Japan ...................................... 7-197891

[51] Int. Cl.[6] ...................................................... H04N 1/54
[52] U.S. Cl. ........................... 382/163; 358/504; 358/527
[58] Field of Search ............................ 358/518, 520–523, 358/527, 533–536, 504; 382/162–163; H04N 1/54

[56] References Cited

U.S. PATENT DOCUMENTS 5,287,418  2/1994  Kishida ..................................... 358/527

*Primary Examiner*—Kim Yen Vu
*Attorney, Agent, or Firm*—Winderoth, Lind & Ponack, L.L.P.

[57] ABSTRACT

A method is provided for the control of a color tone during production of a reproduced color image by tonal conversion of a light quantity of each pixel into a halftone. The method includes setting, at a position between a highlight area and a shadow area in a color original image, a color tone control point, defining adjustment conditions at the color tone control point in terms of dot percent values of desired plural color plates. The method also includes introducing a light quantity at the color tone control point, dot percent values of the plates and desired dot percent values set in advance for highlight areas and shadow areas in the plates into a tonal conversion formula to determine values γ for the plates conversion formulas are provided for converting, into dot percent values, light quantities of all pixels ranging from the highlight areas to the shadow areas. The method also includes subjecting light quantities of individual pixels for the plates to tonal conversion and also controlling color tones of the individual pixels for the plates by using the tonal conversion formulas.

20 Claims, 9 Drawing Sheets

METHOD FOR THE TONAL CONTROL OR ADJUSTMENT OF REPRODUCED COLOR IMAGE AND PICTURE PRODUCING SYSTEM MAKING USE OF SAID METHOD

BACKGROUND OF THE INVENTION (i) Field of the Invention

This invention relates to a novel method for controlling or adjusting a color tone, which can be applied inter alia upon production of a reproduced color image (e.g., a printed picture) of a halftone by subjecting to tonal conversion pictorial information obtained from a color original picture recorded on one of various recording media, for instance, pictorial information obtained from a color-film (i.e., transparent) original image of a continuous tone photographed and recorded on a photosensitive emulsion layer. This invention also relates to a picture producing system making use of the above method, namely, a picture producing system for producing a reproduced color image of a halftone by subjecting, to tonal conversion, pictorial information obtained by photoelectrically scanning a color original image of a continuous tone, and especially to a picture producing system provided as a core element with a tonal conversion unit having new functions.

More specifically, the present invention provides a novel tonal conversion technique useful upon production of a reproduced color image, which has two characteristic features. First, instead of using conventional density information as pictorial information on a color original image, the present invention uses light quantities to eliminate the potential problem that pictorial information may be affected by a characteristic curve of a recording medium on which the color original image is recorded, namely, a characteristic curve defined by light quantities entered the recording medium and corresponding densities formed on the recording medium. Second, upon performing tonal conversion of the above-mentioned light quantities of the color original image, a specific tonal conversion formula is used and, when the tonal conversion formula is used, a function to adjust a color tone is combined so that the color tone, nothing to say the gradation, can be controlled in a quantitative, rational manner.

This invention is therefore concerned with a novel tonal conversion technique which, as described above, controls a gradation and a color tone in combination.

In the subsequent description of the present invention, an emphasis will be placed especially on the control or adjustment of a color tone in view of the fact that adjustment of a color tone upon tonal conversion has been rationalized in a quantitative manner although such adjustment has heretofore been considered to be difficult under the conventional art.

Therefore it should be borne in mind that the present invention is not limited in its application field to the control or adjustment of a color tone upon production of a reproduced color image of a halftone but is also important for performing control of a gradation in a quantitative, rational manner at the same time.

(ii) Description of the Related Art

As is known well, a variety of reproduced color images—such as printed pictures, copied pictures, printer output pictures and TV (video) images—are produced from color original images recorded on various recording media by various reproducing techniques. The term "reproduced image" as used herein should therefore be interpreted in a broad sense.

In the production of these reproduced color images, it is an extremely important theme, first, to reproduce on a reproduced color image a gradation and a color tone of a color original image in a Hi-Fi (High-Fidelity) color and, second, to adjust the quality (including both the gradation and the color tone) of the reproduced color image as desired.

Under the current situation, however, it is impossible under the conventional art to rationally attain the above-mentioned theme by any standardized work procedures.

This can be attributed to the fact that, in the technique for faithfully reproducing the quality (i.e., gradation and color tone) of a color original image on a reproduced color image and also in the technique for adjusting (i.e., correcting or modifying) the quality of the color original image into a desired quality, a non-linear conversion processing technique for converting pictorial information on the color original image, especially its pictorial density information into a halftone—said processing technique being fundamental to the reproducing technique and the adjusting technique and hereinafter being called the "tonal conversion technique" or "tonal conversion method" of an image is not supported by any rational theory and tonal conversion of an image is performed in a non-scientific, non-rational manner while relying substantially upon human experiences and perception.

The above-described matters will hereinafter be described referring to a technique for the production of a printed color picture which has relevance to the present invention and always requires high quality.

Concerning the production of a printed color picture as a reproduced image from a color film original (it is to be noted that about 90% of color originals are of the transparent type), it was not conceived in the conventional art to rationally ascertain density characteristics from a highlight area to a shadow area in the color film original. Regarding the setting of a "color separation curve" (which is also called a "color separation work characteristic curve" or "halftone characteristic curve") which determines a correlation between a color-film original image of a continuous tone and a printed color picture of a halftone as a reproduced picture, the conventional art can be considered to depend totally upon human experiences and perception.

In general, production of a printed color picture is performed as will be described next. Namely, a color-film original image (hereinafter merely called the "color original image") is subjected to color separation by a color scanner and multicolor printing is then conducted through plate of different colors (generally, using four color plates, that is, a C plate, an M plate, a Y plate and a BL plate in combination), whereby a printed color image of a halftone is reproduced.

Incidentally, as is known well, the C plate, M plate and Y plate correspond to R (red), G (green) and B (blue) under an additive color process and are in a complementary color relationship under a subtractive color process. The BL plate is also called a black plate.

The above-mentioned color scanner or a total scanner is an mechatronized, extremely expensive equipment. One of the significant problems in the present business field is that its rate of operation is about 30% on average, that is, at an extremely low level. Primary reasons for the low rate of operation of the expensive color scanner or the like include a long setup time required for the operation of the color scanner or the like and frequent rescanning or remaking needed due to the unstable and insufficient quality of products obtained by color separation work.

This will be discussed further from a technical viewpoint. As an equipment for color separation work, an advanced and expensive, mechatronized color scanner is used as described above. However, plural essential technologies for color separation work, for example, color-reproduction and color-correction technology and gradation-converting technology are not systematically combined in good conformity. This can be regarded as a main cause for the low rate of operation of the color scanner.

As is known well, of the above-described two essential technologies, techniques for color reproduction or the like have been scientifically pursued by applying the masking equation or the Neugebauer equation.

However, the latter technology, that is, the conversion technology for a density gradation (which is essentially concerned with how large dots should be set for all pixels in a color original image) has remained without rational or theoretical corroboration. It is the current situation that this part of work is heavily dependent on human experiences and perception.

Since a variety of color separation equipments have been developed under such circumstances, the basic design technology for equipments themselves is incomplete when taken from the viewpoint of performing color separation with a color tone and a gradation adjusted in combination and moreover, actual color separation work cannot be performed without operator's guess work, experiences and perception despite the use of an advanced expensive color scanner. It is therefore impossible to always produce printed color pictures of stable high quality.

Color separation work cannot be practiced in a rational efficient manner especially when a color original image is not an original of standard quality prepared under appropriate photographing and exposure conditions and adequate developing conditions, for example, is an original of non-standard quality such as an excessively bright original due to over exposure, an excessively dark original due to under exposure, an original of high key or low key, an original containing color casting or a faded original. Namely, the conventional art cannot rationally perform color separation work for color original images of such non-standard quality, and is also accompanied by problems such as the above-described low operation rate of color scanners, unstable quality of products and increased rescanning rate.

SUMMARY OF THE INVENTION

The present inventors have basic understanding such that prior to attempting improvements in color reproduction and color correction techniques, a technique for the conversion of a density gradation of each pixel in a color original image must be made rational to achieve even rational production of reproduced color images of a halftone having desired quality (gradation and color tone) from the above-described various color original images, to say nothing of faithful reproduction of the quality of a color original image (i.e., the quality which is evaluated in both gradation and color tone).

As is known well, the density gradation of a color original image can be reproduced on a reproduced color image of a halftone by changing the size of dots (the variable-area gradation method), the arrangement of specific dots (the multivalued variable-area gradation method) or the densities of pixels themselves where the pixels have a predetermined size (which can be the size of each pixel defined by screen ruling). Although there are a variety of methods for the expression of a halftone, the term "halftone" will hereinafter be used irrespective of the expression method for the sake of convenience for description.

Based on the above-mentioned basic understanding, the present inventors already proposed methods for the rational tonal conversion of a gradation of a color original image in accordance with a novel tonal conversion formula and have obtained certain advantageous results (see, for example, U.S. Pat. No. 4,924,323; U.S. Pat. No. 5,313,310; U.S. Pat. No. 5,057,931; U.S. Pat. No. 5,134,494).

The novel tonal conversion previously which the present inventors previously proposed has a close relationship with the present invention. Accordingly, the above-mentioned novel tonal conversion method previously proposed by the present inventors will now be described in brief, and its improvements will be described. Needless to say, these improvements have become essential technical elements of the present invention.

After that, the present invention will be described using production of a printed color picture as a technique for the production of a reproduced color image.

In the conventional art, based on a photographic color picture (color original image) entered a "recording medium" of a photosensitive material (photosensitive emulsion) from an original image in a literal sense (i.e., an actual scene or object, for example, an apple itself if an object is the apple) and recorded under predetermined exposure conditions (as is well known, an exposure E is expressed by the following formula: $E = I \times t$ where I represents the intensity of incident light and t stands for a time during which the light enters), the color separation of a color original image is conducted by using, as a basis, density information on the photographic color picture. The term "color separation work" as used herein means to include both the reproduction of a gradation and the reproduction of a color tone as described above.

As is known well, when a photosensitive material with an object such as a still life or a person photographed thereon is developed, photographic densities are formed on the photosensitive material, and these photographic densities become a medium image. A curve, which represents a correlation between the above-mentioned photographic densities (blackening degree) and exposures E of the photosensitive material, is a photographic density characteristic curve. This is shown by plotting photographic densities (D) ($D = \log I_o/I$) along the ordinate and logarithmic values ($\log E$) of exposures E along the abscissa. Needless to say, in the above-mentioned photographic density (D), the ratio of the intensity $I_o$ of incident light to the intensity I of transmitted light is used in the case of a film or dry plate (i.e., a transparent original), but the ratio of the intensity $I_o$ of completely-reflected light to the intensity I of reflected light is employed in the case of a photographic paper (i.e., a reflection original).

The above-described photographic density characteristic curve (hereinafter merely called the "density characteristic curve") is in the form of a complex curve which typically has a downwardly-convex foot portion, a substantially-linear straight portion (linear intermediate portion) and an upwardly-convex shoulder portion (in this respect, reference should be had to FIG. 1 which will be described subsequently herein).

In the conventional art, color separation work is conducted based on the density information value of each pixel of a color original image.

In other words, the color separation technique according to the conventional art has been developed from the standpoint of the ordinate (density values) of the above-described density characteristic curve. Image information values (density information values) of a color original image (medium image), based on which the conventional art conducts color separation work, are however not in a proportional relationship with image information values of its corresponding original image (actual scene or object) and have been significantly affected by the photosensitive characteristics (density characteristic curve) of a photosensitive material (photosensitive emulsion) as a recording medium. Namely, photographic densities of a color original picture as a medium image are not correlated in a linear relationship (i.e., in a 1:1, that is, 45° linear relationship) with exposures (logarithmic values) which are image information values from the original image (actual scene or object).

Incidentally, it is well-known that the discrimination characteristic of brightness or darkness in the human visual sense is logarithmic. A man determines a degree of brightness or darkness by evaluating a light quantity, which enters his visual system from an object (actual scene), on the basis of the aforementioned discrimination characteristic. Here, a picture in which a gradient of density variations is linear is felt natural.

As is apparent from the foregoing, the performance of color separation work on the basis of density values (D=log Io/I) of a medium image recorded on a photosensitive material upon production of a printed color picture means use of density information values already affected by the photosensitive characteristics of a photosensitive material. This does not mean that image information values (light quantities) obtained from an object (actual scene), which is the real object for the reproduction, are used.

With the foregoing circumstances in view, the present inventors have proceeded with an extensive investigation with a view to developing a method for producing a printed color picture by using, as image information for the production of the printed color picture, image information values relevant to light quantities such as primary (neat or original) exposures available from an object (actual scene) instead of taking the approach which uses image information values of a medium image non-linearly modified (affected) by the photosensitive characteristics (density characteristic curve) of a recording medium (photosensitive material), namely, density information values.

As a result, it has been found that a printed color picture of excellent picture quality having image characteristics faithful to an object (actual scene) can be produced when conversion work of a density gradation, said conversion work being of first-ism importance, in color separation work is performed by:

(1) determining a value on the abscissa (log E=log I×t) from each density value on the ordinate (D=log Io/I) of a density characteristic curve (photographic density characteristic curve) of a photosensitive material on which a color original image has been photographed and recorded (hereinafter, the ordinate and abscissa may also be called the "D axis" and "X axis", respectively), in other words, by determining a light quantity on the X axis from each density on the D axis with respect to the color original image (medium image);

(2) more specifically, projecting a density information value ($D_n$) on the D axis of a desired pixel point (point: n) on the color original image onto the X axis via the density characteristic curve to determine an image information value ($x_n$) relating to an exposure of the pixel; and then (3) based on $x_n$ values (light quantities) so obtained, conducting tonal conversion of the image in accordance with the tonal conversion formula previously proposed by the present inventors (this tonal conversion is exactly the same as the tonal conversion formula employed in the present invention to be described subsequently herein, but the present invention is totally different in the use and application aspects of the tonal conversion formula).

The above-mentioned tonal conversion technique previously proposed by the present inventors is applied, as is evident from the foregoing, for tonal conversion which is of first-ism importance upon production of a printed color picture of a halftone.

Namely, the above-mentioned tonal conversion technique proposed by the present inventors is employed for producing a reproduced color picture of a gradation natural to the human visual sense, in essence, by subjecting the density gradation of each of various original images including color original images to tonal conversion with 1:1 fidelity.

The above-mentioned tonal conversion technique is useful in reproducing a density gradation, which an object (actual scene) is recognized to have (i.e., is recognized to inherently have), even if a color original image is not of standard quality but is an original of non-standard quality (e.g., an overexposure or under-exposure original, a high-key or low-key original, or a color-fogged or faded original).

It has also been confirmed that the above-mentioned tonal conversion technique can reproduce a color tone with top quality while achieving faithful reproduction of a density gradation.

As has been described above, the tonal conversion technique proposed previously by the present inventors:

primarily places importance on tonal conversion in color separation work, in other words, places importance on the realization of Hi-Fi conversion of a density gradation (namely, between an original image of a continuous gradation and a reproduced image of a halftone, to convert the continuous gradation with high fidelity of 1:1); and has been confirmed to achieve rational tonal conversion with high fidelity and also to attain high-quality reproduction of a color tone concurrently with the tonal conversion.

The market need for the quality of printed color pictures is not limited to the reproduction of each printed color picture having exactly the same quality (gradation and color tone) as its color original image but has been increasingly heightened, complicated and diversified.

These needs include, for example, a need for emphasized reproduction of a particular part (a person, a ceramic ware, a dress, furniture, woodwork, a painting or the like) in a color original image and a need for modification of an overall color tone into a desired color tone such as a blue, dark green, light green pink or sepia tone.

Reliance upon a conventional color correction technique for meeting such a need, however, encounters the problem that, even if a color tone of a particular part or a specific area (region) can be reproduced as required, the quality of the whole image is rendered uneven and is significantly deteriorated and the above need cannot be satisfactorily met.

Needless to say, to meet the above-mentioned need, it is important to establish a conversion technique for a gradation and a color tone so that both a color tone of a particular part or specific area (region) and the quality of an entire image can give natural feeling to the human visual sense.

To meet the above-mentioned heightening and complication of the market needs means to achieve combination or unification (fusion) of a gradation tonal conversion technique and a color-tone adjusting technique in color separation technology.

What should be kept in mind here is that in the case of a printed color picture by way of example, dots which form the printed color picture always have direct relations with both a gradation and a color tone or with both a density and a color, respectively. This is obvious, because it is the size of each dot (which determines a density gradation) and a tinting ink coated to the dot point (which specifies a color tone that determines the picture quality.

In the previously-proposed tonal conversion technique, the present inventors have already established means for rationally adjusting or controlling the size of dots (dot percent). The present inventors therefore proceeded with an extensive investigation under the understanding that combination or unification of the above-described gradation-adjusting technique and color tone adjusting technique lies on an extension of the tonal conversion technique previously proposed by the present inventors.

As a result, the present inventors have found that both a color tone and a gradation can be rationally adjusted or controlled in color separation work when an idea of color tone adjustment is introduced while making use of the tonal conversion formula which is a core of the previously proposed tonal conversion technique.

The present invention has been completed based on the above finding. The present invention provides a color separation method for rationally adjusting or controlling both a color tone and a gradation, especially a color-tone control or adjustment method which permits adjustment of a color tone to a desired color tone while achieving high-quality reproduction of a gradation, although it has heretofore been considered difficult to attain both the color-tone adjustment and the high-quality reproduction. Keeping in mind the technical similarity observed between a color scanner and a picture producing system which are both employed for the production of a printed color picture, the present invention also provides a picture producing system suited for use in practicing the above-described method.

In one aspect of the present invention, there is thus provided a method for the control or adjustment of a color tone upon production of a reproduced color image by tonal conversion of a light quantity of each pixel into a halftone, said pixel having been obtained from a color original image recorded on a predetermined recording medium in accordance with a characteristic curve of said recording medium, said characteristic curve being a correlation curve between light quantities entered said recording medium and corresponding densities formed on said recording medium, characterized in that said method comprises the following steps:

i) setting, at a desired position between a highlight area and a shadow area in said color original image, a color tone control point ($M_1$) for controlling said color tone of said reproduced color image;

ii) defining adjustment conditions for a color tone at said color tone control point ($M_1$) in terms of dot percent values of desired plural color plates to be employed for the production of said reproduced color image;

iii) introducing (a) a light quantity at said color tone control point ($M_1$), (b) said dot percent values of said individual color plates reflecting said adjustment conditions for said color tone at said color tone control point ($M_1$) and (c) desired dot percent values set in advance for highlight areas and shadow areas in said individual color plates into a below-described tonal conversion formula, respectively, to determine values γ for said individual color plates, whereby tonal conversion formulas are provided for converting, into dot percent values, light quantities of all pixels from said highlight areas to said shadow areas in said individual color plates; and iv) subjecting light quantities of individual pixels for said respective color plates to tonal conversion and also controlling or adjusting color tones of said individual pixels for said respective color plates, both, by using said tonal conversion formulas for said respective color plates in which said values γ have been determined.

<Tonal Conversion Formula>

$$y_n = y_H + [\alpha(1-10^{-kx})(y_S - y_H)/(\alpha - \beta)]$$

where x: $(x_n - X_H)$, that is, a base light quantity obtained by subtracting a light quantity ($X_H$), which corresponds to a density information value ($D_H$) of said highlight area of said color original image as determined using said characteristic curve of said recording medium, from a light quantity ($x_n$) corresponding to a density information value ($D_n$) of a desired pixel point (point: n) on said color original image as determined likewise;

$Y_n$: a dot percent value set for a pixel on said reproduced color image, said pixel corresponding to said desired pixel point (point: n) on said color original image;

$Y_H$: a dot percent value set in advance for said highlight area on said reproduced color image corresponding to said highlight area on said color original image;

$y_S$: a dot percent value set in advance for said shadow area on said reproduced color image corresponding to said shadow area on said color original image;

a: a surface reflectivity of an image expressing medium for recording said reproduced color image;

β: a value determined by $\beta = 10^{-\gamma}$;

k: a value determined by $k = \gamma/(x_S - x_H)$, in which $x_S$ represents a light quantity corresponding to a density information value ($D_S$) of said shadow area of said color original image determined by using said characteristic curve of said recording medium; and γ: a desired coefficient.

In another aspect of the present invention, there is also provided a picture producing system for producing a reproduced color image of a halftone on a desired image expressing medium by subjecting pictorial information on a color original image of a continuous tone to tonal conversion at a tonal conversion unit of said picture producing system, characterized in that said tonal conversion unit comprises:

(A) a tonal conversion system for converting a continuous tone to a halftone, said tonal conversion system having:

(A-1) a function to determine a light quantity (value: x) from a density (value: D) by using a characteristic curve of a recording medium on which said color original image is recorded, said characteristic curve being a characteristic curve defining by a D-x rectangular coordinate system a relationship between light quantities entered said recording medium and corresponding densities formed on said recording medium, and (A-2) a function to perform tonal conversion of said light quantity (value: x) by using a above-described tonal conversion formula, thereby determining a halftone intensity (value: $y_n$); and (B) a color tone adjusting system for adjusting a color tone upon conducting said tonal conversion, said color tone adjusting system having:

(B-1) a function which, when (i) a color tone control point ($M_1$) for controlling said color tone of said reproduced color image is set at a desired position between a highlight area and a shadow area in said color original image, (ii) adjustment conditions for a color tone at said color tone control point ($M_1$) are set in terms of halftone intensities of desired plural color plates to be employed for the production of said reproduced color image and (iii) halftone intensities which are to be set in advance for highlight areas and shadow areas of said color plates are set, introduce (a) a light quantity at said color tone control point ($M_1$), (b) said halftone intensities of said individual color plates reflecting said adjustment conditions for said color tone at said color tone control point ($M_1$) and (c) desired halftone intensities to be set in advance for said highlight areas and shadow areas in said individual color plates into the above-described tonal conversion formula, respectively, to determine values $\gamma$ for said individual color plates, whereby tonal conversion formulas are provided for converting, into halftone intensities, light quantities of all pixels from said highlight areas to shadow areas in individual color plates; and (B-2) a function to subject light quantities of individual pixels for said respective color plates, said light quantities of said individual pixels having been obtained from said color original image, to tonal conversion and also controlling or adjusting color tones of said individual pixels for said respective color plates, both, by using said tonal conversion formulas for said respective color plates in which said values $\gamma$ have been determined.

The color separation technique according to the present invention uses the specific tonal conversion formula. Nonetheless, it can achieve adjustment of a gradation and adjustment of a color tone in combination although the concurrent attainment of these adjustments has heretofore been considered difficult. The picture producing system according to the present invention can perform color separation while achieving both adjustment of a gradation and adjustment of a color tone in combination by using the specific tonal conversion formula at the tonal conversion unit as a core element. The quantitative and rational combination of the above-mentioned adjustment of the gradation and that of the color tone has been difficult under the conventional art. The present invention has therefore furnished a breakthrough point to the difficulty.

According to the conventional art, if one attempts to conduct adjustment (i.e., correction or modification) of a color tone at a specific part or area of an image, for which there is a high market need or requirement, concurrently with adjustment (i.e., correction or modification) of a color tone of the entire image, it is the current situation that no reproduced color image of high quality can be produced because the conventional art cannot perform the adjustments of the color tones in a quantitative manner and moreover, the balance in color tone between the specific part area and the other parts or areas is impaired and/or the quality (gradation and color tone) of the entire image becomes uneven.

In contrast, owing to the adoption of the specific tonal conversion formula and its application, the color separation technique according to the present invention has made it possible to perform the adjustment of a gradation and that of a color tone in a fully quantitative manner, to subject a color original image to color separation in conformity with an objective or purpose, and further to efficiently produce a reproduced color image of high quality with good reproduction of the gradation and good adjustment of the color tone.

Namely, the color separation technique according to the present invention can bring about inter alia the following advantageous effects:

(1) It is possible to rationally meet ever-heightened, complicated and diversified market needs or requirements for the quality of reproduced color images such as printed color pictures.

(2) As the production of a reproduced color image, especially the color separation work can be rationally practiced in a quantitative manner, significant advantageous effects can be brought about in making an improvement in the productivity, shortening the working time, effectively utilizing the facilities, and saving or reducing consumption-type materials.

(3) In the production of a reproduced color image such as a printed color picture, it is possible to develop an approach which permits rational utilization of sensitivity and artistic sense. This approach makes it possible to incorporate sensitivity and artistic sense in an industrial production method as required in printing industry and the like, so that a contribution can be made to the activation of image-related industry such as printing industry. Further, this also makes LO it possible to add a high value to a picture producing system.

DETAILED DESCRIPTION OF THE INVENTION AND PREFERRED EMBODIMENTS

Figure 1:
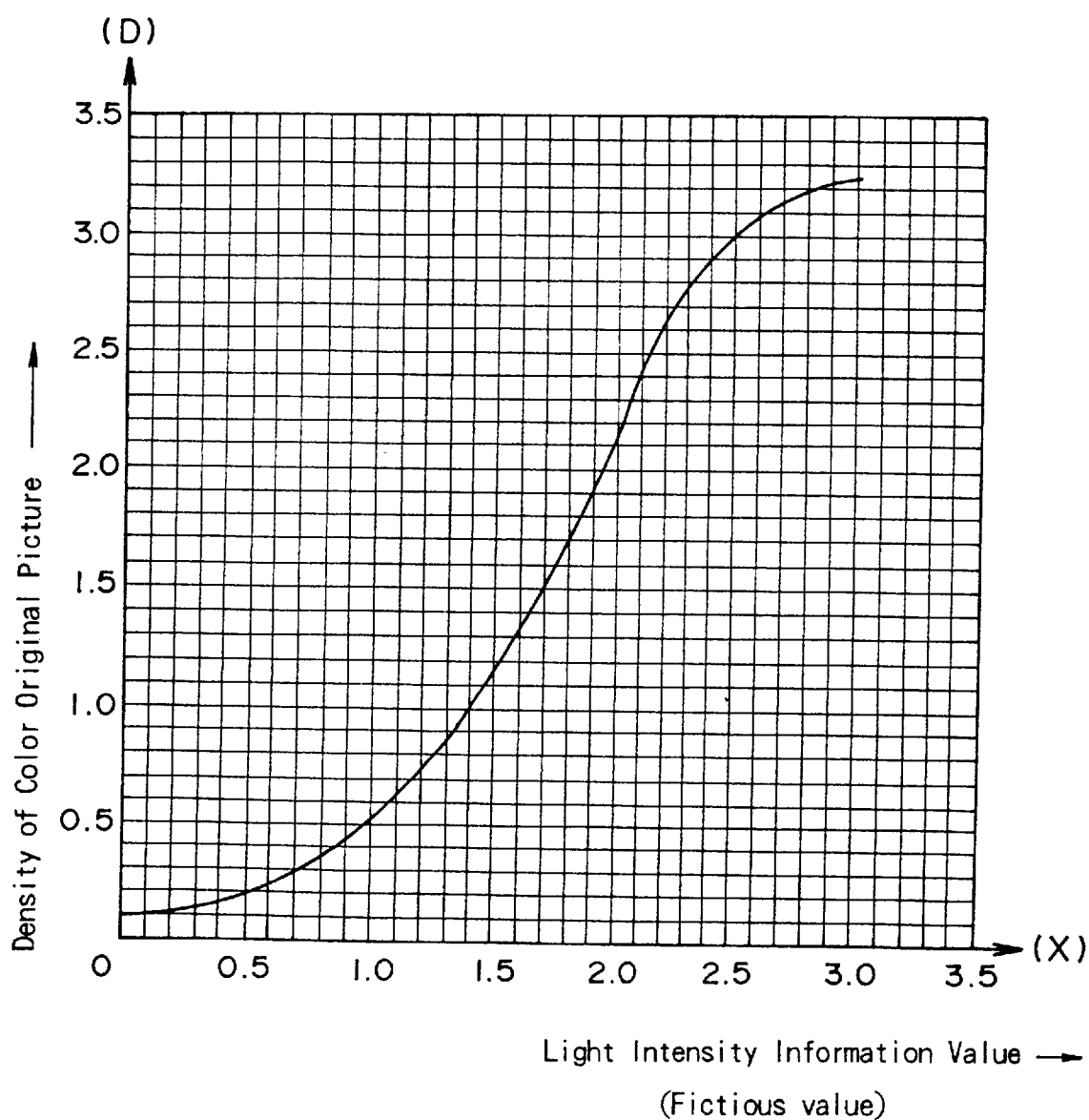
FIG. 1 is a diagrammatic representation of a density characteristic curve of a color film (product of Company F)

Technical features and embodiments of the present invention will hereinafter be described in detail.

As has been described above, this invention provides a new color separation technique which can perform adjustment of a gradation and adjustment of a color tone in combination.

However, in the subsequent description, an emphasis will be placed especially on a method for the control or adjustment of a color tone and also on a color-tone control by adjustment means in a tonal conversion unit as a core element of the image producing system in view of the current situation that a color tone cannot be adjusted or controlled in a rational quantitative manner.

For the sake of convenience of description, a description will be made first of image information and a color original image.

A significant feature of the present invention is that image information correlated with light quantities is used as image information to be employed upon production of a reproduced color image from a color original image instead of a density-correlated image information as in the conventional art.

Further, the term "color original image" as used herein means a color original image recorded or accumulated on a predetermined recording medium and may also be called a "medium image". On the other hand, an image before its recording or accumulation on the above-mentioned recording medium, namely, a true object for reproduction is called an "actual scene (object)".

The color-tone control or adjustment method according to the present invention will hereinafter be described referring, as an example, to the production of a printed color picture as a reproduced color image.

It is therefore to be noted that the reference to 5 the printed color picture is merely for the convenience of the description and does not mean any sole applicability of the color-tone control or adjustment method according to the present invention to the reproduction of a printed color picture.

To facilitate understanding of the present invention, the tonal conversion technique making use of the above-mentioned tonal conversion formula will be described in brief before describing specific color-tone adjustment methods in detail.

As has been described above, color scanners (color separation equipment) are now very widely used in reproduction work of printed color pictures. Color separation work by the color scanner is performed based on density information values obtained from a color original image, which is a medium image and can be either a transparent original or a reflection original. More specifically, for the production of a printed color picture, a C plate (cyan), an M plate (magenta), a Y plate (yellow) and a BL plate (black) are generally fabricated based on density information values obtained from a color original image (i.e., medium image) through (RED), (GREEN) and (BLUE) filters.

A method, which uses density information values of a color original image (i.e., medium image) recorded on a photosensitive material as a recording medium as described above, however, is accompanied by the above-mentioned limits (i.e., drawbacks).

In contrast, the present invention is based on the conception that a true object of reproduction should by all means be a color original (in its literal sense) image as an origin of a medium image rather than an image (medium image) recorded on a recording medium. That is, an object (actual scene) itself and the image information values which should be used in the reproduction should be based on image information values correlated to light quantities which have entered the recording medium from the object.

The above-described features are basic differences between the tonal conversion technique according to the present invention and the conventional art.

Describing this from another angle, the following description can be made.

In color separation technology, a color original image of a contiguous gradation (for example, transparency-type color film original) has to be converted into a printed color picture of a halftone by tonal conversion. As has been described above, it is a color separation curve (tonal conversion curve) that defines a correlation between an image of a continuous gradation or tone and an image of a halftone.

A conventional color separation curve is set on the basis of density information values formed on the D axis (density axis) of a photosensitive characteristic curve of a photosensitive material as a recording medium (i.e., a photographic density characteristic curve defined by a D-X rectangular coordinate system).

In contrast, a color separation curve employed in the present invention is set based on image information values correlated to light quantities of an object (actual scene) on the X axis of a photographic density characteristic curve. Namely, it is therefore concluded that a D-axis color separation curve is used in the conventional color separation technology while an X-axis color separation curve is employed in the present invention. The conventional color separation technology and the color separation technique according to the present invention are therefore fundamentally different from each other.

Next, a description will be made about how an image information value, that is, light quantity of each pixel in a color original image is determined by the tonal conversion method of the present invention for the image. Such a method makes use of the above-described tonal conversion formula.

Provided first is a characteristic curve of a photosensitive material employed as a recording medium for photographing a color original image (medium image). Specifically a density characteristic curve provides a relationship between photographic densities (D=log Io/I) and image information values correlated to light quantities which have entered the photosensitive material as the recording medium, namely, logarithmic values of exposures (E=I×t).

To determine a light quantity ($x_n$) from the density ($D_n$) of a desired pixel (point: n) in the color original picture via the above-described density characteristic curve, the above density characteristic curve is next converted into a functional formula. To achieve this, it is only necessary, for example, to convert into a functional formula a density characteristic curve which corresponds to the above recording medium. The density characteristic curve is furnished as technical information from the maker of the photosensitive material maker. If the conversion is rational, each $D_n$ value on the D axis can be readily converted into its corresponding $x_n$ value on the X axis.

FIG. 1 shows a density characteristic curve ("FUJI CHROME", trade mark; product of Company F).

Further, the results obtained by converting the density characteristic curve of FIG. 1 into numerical formulas are shown in Table 1. As is shown in Table 1, with a view to converting the density characteristic curve into a numerical formula as precisely as possible, the density characteristic curve was divided into eight (8) sections and its conversion into a numerical formula was attempted in each of the eight sections. Obviously, the greater the number of divided sections of the density characteristic curve, the greater the accuracy of the resulting functional formulas.

TABLE 1

List of Functional Formulas
of Density Characteristic Curve
Density Characteristic Curve of Color Film
("FUJI CHROME", product of Company F) (FIG. 1)
Numerical formulas for converting color original
density ($D_n$) on the D axis into values ($X_n$) on the
X axis

| No. | $D_n$ | $X_n$ |
|---|---|---|
| 1 | 0.10–0.50 | $X = \log((D - 0.0424) \div 0.04576)$ |
| 2 | 0.50–1.00 | $X = 1.00 + 0.7800(D - 0.50)$ |
| 3 | 1.00–1.50 | $X = 1.39 + 0.6200(D - 1.00)$ |
| 4 | 1.50–2.00 | $X = 1.70 + 0.4400(D - 1.50)$ |
| 5 | 2.00–2.50 | $X = 1.92 + 0.4200(D - 2.00)$ |
| 6 | 2.50–2.80 | $X = 2.13 + 0.5000(D - 2.50)$ |
| 7 | 2.80–2.95 | $X = 2.28 + 0.8000(D - 2.80)$ |
| 8 | 2.95–3.20 | $X = 1.3 + e^{\frac{1}{100} \cdot 10(D-2.5608) \div 0.3975}$ |

In the above-described conversion of the density characteristic curve into the numerical formulas, each function which defines a correlation between D and X was determined under the premise that a scale along on the D axis, which indicates densities of the color original image (medium image), is the same as a scale along the X axis, which shows image information values correlated to light quantities of the object (actual scene) as expressed in terms of log E.

This is a sort of fiction conducted from a viewpoint, which will be described next, and the present inventors consider it to be rational. In this sense, the term "fictious value" is used along the X axis in FIG. 1.

Concerning the photographic density characteristic curve, the logarithmic value (log E=log Ixt) of an exposure E is plotted along the X axis. This is in conformity with the fact that the discrimination characteristic of the visual sense for brightness or darkness is logarithmic like the recognition (visual feeling) of a density along the D axis. The fiction about the above-described scale is therefore believed to be rational.

The above-mentioned use of the scales in the present invention is a kind of simplification method, so that the present invention is obviously not limited to the use of such scales.

As has been described above, the present invention is performed based on image information values ($x_n$) correlated to light quantities which have entered a recording medium (photosensitive material) from an object (actual scene) and plotted along the X axis rather than using as a basis density values ($D_n$) of a color original image (medium image) formed by photographic recording of the object on the recording medium.

Since each $D_n$ value and its corresponding value $x_n$ on the density characteristic curve are correlated by the functional formula X=f(D) as is shown in Table 1, each value $x_n$ can be easily determined from its corresponding value $D_n$ as described above.

The above-described method for determining each light quantity ($x_n$) from its corresponding density ($D_n$) of the color original image is applied typically to a color-film (transparency-type) original image as a color original image. Namely, the method is applied to a transparency-type color original image on a photosensitive emulsion layer as a recording medium The photosensitive emulsion layer has a specific photographic density characteristic curve.

On the other hand, in the case of a reflection color original image such as a painting, it is possible to regard the density characteristic curve as a linear curve, namely, in such a way that each density value ($D_n$) and its corresponding light quantity ($x_n$) are correlated to each other in a 1:1 relationship.

More specifically, it is only necessary to use each measured density value ($D_n$) directly as its corresponding light quantity ($x_n$).

According to the tonal conversion technique of the present invention, it is then required only to determine a color separation curve (tonal conversion curve), namely, an X-axis color separation curve as a substitute for the conventional D-axis color separation curve by using light quantities ($x_n$) obtained as described above and the above-described tonal conversion formula and further to conduct tonal conversion of the image.

Described specifically, from the density value ($D_n$) at a desired pixel (point: n) on an original image, an image information value ($x_n$) correlated to the corresponding light quantity of the same pixel is determined in accordance with a predetermined density characteristic curve. By introducing the image information value ($x_n$) into the above-described tonal conversion formula, a halftone intensity, namely, a dot area percent (hereinafter merely called a "dot percent") ($y_n$) is calculated. It is then necessary only to input such dot percents ($y_n$) in a dot generator of a color scanner so that a desired screen is formed.

The derivation process of the above-described tonal conversion formula useful in the practice of the present invention will now be described in brief.

The tonal conversion formula, which is used to obtain dot percents ($y_n$) for use upon production of the above-described printed color picture of a halftone, was derived from a commonly-recognized density formula (photographic concentrations, optical concentrations), namely, $$D = \log I_o/I = \log 1/T$$

where

Io: incident light quantity;

I: reflected light quantity or transmitted light quantity;

$T = I/I_o$: reflectance or transmitted light quantity.

When the above-described general formula for densities D is applied to plate making or printing, each density in plate making or printing can be expressed as follows:

$$\begin{aligned}
\text{Density } (D') \text{ in plate making or printing} &= \log(I_o/I) \\
&= \log \text{ unit area} \times \text{reflectance of paper} / [(\text{unit area} - \text{dot area}) \times \text{reflectance of paper} + \text{dot area} \times \text{surface reflectance of ink}] \\
&= \log \alpha A / [\alpha\{A - (d1 + d2 + \ldots dn)\} + \beta(d1 + d2 + \ldots dn)]
\end{aligned}$$

where

A: unit area, dn: area of each dot in the unit area;

α: reflectance of printing paper; and

β: surface reflectance of printing ink.

The present inventors have derived the above-described tonal conversion formula on the basis of the concentration formula (D') for plate making or printing so that the basic density (x) at a desired control point (pixel) (point: n) on a color original image of a continuous tone and the dot percent ($y_n$) at a control point on its corresponding printed color picture of a halftone can be correlated with each other to make a calculated value and a measured value coincide with each other.

When a reproduced image such as a printed color picture is produced by using the above-described tonal conversion formula in the present invention, the following dot percents are generally used: 5% as $y_H$ and 95% as $y_S$ for a C plate, and 3% as $y_H$ and 90% as $y_S$ for M and Y plates. In applying the tonal conversion formula, use of values measured by a densitometer as densities and use of such percents as $y_H$ and $y_S$ make it possible to also calculate y values as percents.

In applying the tonal conversion formula, it is free to use the tonal conversion formula by processing or modifying it or deriving a new formula from it as desired, to say nothing of its use by modifying the same as follows:

$$y_n = y_H + E(1-10^{-kx}) \cdot (y_S - y_H)$$

where $$E = 1/(1-\beta) = 1/(1-10^{-\gamma})$$

In the above-described modification, $\alpha$ is set at 1 ($\alpha=1$). This means, for example, that the surface reflectance of printing paper (base material) employed for the expression of a printed color picture is set at 100%. As a value of $\alpha$, any desired value can be used. In practice, $\alpha$ can be set at 1.0 without any substantial inconvenience or problem. This applies equally to luminance images such as video images.

According to the above-described modification ($\alpha=1.0$), the $y_H$ value and the $y_S$ value can be set at a highlight area (H area) and a shadow area (S area), respectively, on the printed color picture as planned. This constitutes a significant feature of the present invention. The above matter is evident from the fact that by the definition, x=0 at the H area and $x = x_S - x_H$ at the S area, both, on the printed color picture, namely, the following equation is obtained:

$$-k \cdot x = \gamma \cdot (x_S - x_H)/(x_S - x_H) = -\gamma$$

As has been described above, the use of the tonal conversion formula (the modification derived by setting $\alpha$ at 1.0) always makes it possible to set values $y_H, y_S$ at H and S areas on a printed color picture as planned. This feature is extremely important for allowing an operator to evaluate the results of work. When the value $\gamma$ is changed, for example, by setting $y_H$ and $y_S$ at desired values on a printed color picture (with the proviso that $\alpha=1.0$), various X-axis color separation curves (tonal conversion curves) can be obtained. Further, the quality of a printed color picture produced in accordance with these X-axis color separation curves can be easily evaluated from its relationship with the value $\gamma$.

To set X-axis color separation curves (tonal conversion curves) for individual color plates for multicolor printing (in general, four plates, that is, a C plate, an M plate, a Y plate and a BL plate are used) by using the above-described tonal conversion formula in accordace with the present invention, it is only necessary to set as will be described next.

In the present field of art, it is the common practice to first set, as a basis, a color separation curve (tonal conversion curve) for the C plate and then to set the color plates in such a way that the gray balance and color balance can be maintained.

The above-described maintenance of gray balance is a condition for the reproduction of neutral density (gray) by three color plates (C, M and Y plates). In the present field of art, the standard values shown below in Table 2 are generally employed to maintain the gray balance.

In Table 2, $M_1$ indicates a gray balance control point set at an intermediate position (which may hereinafter be called the "intermediate point") in a dynamic range (density range) from the H area to the S area. In the present field of art, it is the common practice to set the dot percent of the C plate at 50% as shown in Table 2. It is a main reason for setting the point $M_1$ at the dot percent of 50% of the C plate that an area of this dot percent is widely recognized to be a reproduction range of a good gradation.

From Table 2, it is understood that in the present field of art, the gray balance (neutral density) is maintained by setting, at the point $M_1$ (intermediate tone), the dot percent of the C plate at 50% and the dot percents of the other color plate (M and Y plates) at 40%. Needless to say, the above-described standard values can be changed depending on the characteristics of an ink to be adopted.

TABLE 2

Standard Values for the Maintenance of Appropriate Gray Balance (unit: dot %)

|  | H | $M_1$ | S |
|---|---|---|---|
| C plate | 5 | 50 | 95 |
| M plate | 3 | 40 | 90 |
| Y plate | 3 | 40 | 90 |

As has been described above, the tonal conversion technique according to the present invention has the premise that upon production of a printed color picture, image information values ($x_n$) correlated to light quantities which have entered a recording medium adapted to form a medium image from an object (actual scene) are used instead of using density information values ($D_n$) available from a color original image (medium image) and the above-described tonal conversion formula is used. The tonal conversion technique according to the present invention can therefore produce a printed color picture having gradation characteristics faithful to the object (actual scene) and further, can produce a printed color picture of gradation characteristics modified to desired ones with universality and flexibility under standardized work procedures.

A description will next be made about the core technical feature of the present invention, namely, the incorporation of the color tone adjustment technique in the above-described tonal conversion technique, in other words, the combination of the tonal conversion technique and the color tone control or adjustment technique.

The motivation toward the above-mentioned combination of a gradation adjustment and a color tone adjustment resided in the following points:

(1) The tonal conversion formula, which was previously proposed by the present inventors and is also used in the present invention, is an important tool in faithfully reproducing the dot percents (in other words, the sizes) of dots of all pixels ranging from an H area to an S area of a printed color picture, primarily gradation characteristics of the color original image and adjusting to a color image having gradation characteristics natural to the human visual sense.

(2) A dot percent which is set for each pixel always has a direct relationship with both a gradation and a color tone (or a density and a color) and also has influence thereto.

(3) As a market need, there are an increasing number of cases which require not only 1:1 reproduction (Hi-Fi reproduction) of a color original image but also emphasis, modification and/or correction of a color tone of a specific part or particular area in the image. In connection with these requirements, customers, designers and the like express details of their requirements by indicating or designating dot percents by color charts owned by them. A detailed description will be made of such color charts subsequently.

(4) When the conventional color separation technology, especially the conventional color correction, is used to meet the above-mentioned need, the quality (gradation and color tone) of the entire image is made uneven so that the value as a product may be lost in many instances, even if the color tone of a specific part can be made close to the required details.

A color chart is a standard scale (in other words, a reference table) for the reproduction of all colors by colors which are expressed by density gradations of dots using printing process inks of four primary colors. Examples of the color chart include "DIC GRAF-G Color Chart" published March, 1991 by Dainippon Ink & Chemicals, Incorporated.

The above described color charts show various combinations of color plates for the reproduction of colors as will be described below.

1. Basic combinations:

There is a chart based on combinations of C (cyan) and M (magenta).

For example, a basic pattern is formed by printing C along the ordinate and M along the abscissa, each in 12 gradations ranging from 0% to 100% in dot percent. Y (yellow) and BL (black) of predetermined dot percents are printed over the basic pattern to form a color chart. Examples of the Y and BL of the predetermined dot percents include Y=10% and BL=10%, Y=10% and BL=30%, and Y=50% and BL=10%.

2. Other combinations:

(1) A combination of Y along the ordinate and M along the abscissa.

(2) A combination of C along the ordinate and Y along the abscissa.

(3) A combination of BL along the ordinate and Y along the abscissa.

(4) A combination of BL along the ordinate and M along the abscissa.

(5) A combination of C along the ordinate and BL along the abscissa.

As has been described above, each color tone on a color chart is designated by dot percents of individual color plates (C/M/Y/BL).

To meet demands for color tone modifications based on the above-mentioned color chart from customers, graphic designers or the like, it is therefore obviously necessary to be equipped with a technique for controlling or adjusting, as a color separation technique, all dot percents of individual pixels in a quantitative and rational manner.

With the foregoing background in mind, the present inventors considered that the above-described tonal conversion formula has the ability to control or adjust dot percents of all pixels ranging from an H area to an S area in a fully quantitative and rational manner and can therefore be used as a powerful tool for the adjustment of color tones. This is the starting point for the development of a color separation technique which can perform both gradation adjustment and color tone adjustment in combination while using the above-described tonal conversion formula as a principal tool.

The color separation technique according to the present invention, which is able to perform both gradation adjustment and color tone adjustment in combination, (especially the color separation technique with control or adjustment of a color tone incorporated therein) can be summarized as follows:

1. First of all, a color tone control point ($M_1$) for the control of a color tone of a reproduced color image is set at a desired position between an H area and an S area of a color original.

In the present invention, as a symbol for the color tone control point ($M_1$), the same symbol ($M_1$) as the intermediate tone point ($M_1$) for maintaining gray balance in Table 2 described above is used. This reflects the fact that the reproduction of a gradation of an intermediate tone range is important in the color separation technique and hence is also important in the reproduction of a color tone. Needless to say, the color tone control point ($M_1$) is not limited to the intermediate tone point for the maintenance of the gray balance but may be set at a desired point between the H area and the S area.

The color tone control point ($M_1$) is indicated by a light quantity on the abscissa (X axis) in a rectangular coordinate system formed of the ordinate (the y axis along which dot percents are plotted) and the abscissa (the X axis along which light quantities are plotted). Incidentally, the light quantity is indicated by a density because the light quantity is correlated to a corresponding density on the color original image.

2. Next, at the color tone control point ($M_1$) designated as described above, color tone adjustment conditions are determined by dot percents of desired color plates (C plate, M plate, Y plate and BL plate).

Specific details of the above-described conditions for the adjustment (modification) of color tones are as explained above in the description of the color chart.

3. The next step is to prepare color separation curves (tonal conversion curves) for use in the production of color plate images on the individual color plates (C plate, M plate, Y plate and BL plate), more specifically to prepare tonal conversion formulas for setting color separation curves for the individual color plates, under the above-described conditions and other conditions given in advance.

Through the above-described steps 1 and 2, the following parameters are set:

the light quantity at the color tone control point ($M_1$), for example, $M_1$=0.400, and the color tone adjustment conditions, for example, at the above-described color tone control point ($M_1$), C plate=50% dot percent, M plate=20% dot percent, Y plate=10% dot percent, and BL plate=10% dot percent.

Further, the dot percents ($y_H, y_S$) which are to be for the H area and S area of each color plate are set at values given as preconditions in advance or at desired values, respectively. Incidentally, the $y_H$ and $y_S$ values given as the preconditions in advance mean, for example, the standard values of 5% and 95% for the C plate and those of 3% and 90% for the M and Y plates as mentioned above in the description about the application of the tonal conversion formulas employed in the present invention (see Table 2).

Under the above-described conditions, application conditions for the above-described tonal conversion formulas to be used for the setting of the color separation curves of the individual color plates, namely, the $\gamma$ values of the tonal conversion formulas are set.

For example, the $\gamma$ value for the tonal conversion formula for setting the color separation curve for the C plate is determined as will be described next.

When the above-described tonal conversion formula is solved by introducing:

$x_H=0.00$, $x_S=1.00$, $x_n=M_1=0.40$, $\alpha=1.00$, $y_H=0$ (%), $y_S=95$ (%), and $y_n=50\%$, a value of $\gamma=0.45$ is obtained. Based on this $\gamma$ value, the tonal conversion formula for setting the color separation curve for the C plate is prepared. This applies equally to the other color plates.

4. The next step is a step for subjecting the light quantities ($x_n$) at all pixels (points: n) ranging from the H area to the S area by using the tonal conversion formula having the above-obtained $\gamma$ value ($\gamma=0.45$), so that a color separation curve (tonal conversion curve) for the C plate is obtained. In other words, the next step is to perform color separation work by using the above-described tonal conversion formula for the C plate so that a color plate image for the C plate is produced. This applies equally to the other color plates.

The effectiveness of the above-described color separation technique according to the present invention, Which is composed in combination of the tone adjustment technique and the color tone adjustment technique, will be substantiated in Examples to be described subsequently herein.

Here, a description will be made about other features and application fields of the color separation technique of the present invention, especially of the color separation technique in which the gradation adjustment technique and the color tone adjustment technique have been incorporated.

The application field of the color separation technique according to the present invention with the color tone control or adjustment incorporated therein is not limited only to the above-described production of printed color pictures, but is broad.

The color separation technique according to the present invention can be applied in all fields where it is intended to produce a reproduced color image from a color original image (medium image) formed by recording, photographing or otherwise picking up through a conversion an object (actual scene) on a desired recording medium while using a communication medium such as light, electromagnetic waves or the like.

Obviously, it is therefore necessary to apply the color separation technique of the present invention so that it can conform with a system which is adapted to produce each reproduced color image.

First, in the definition of the characteristic curve of a recording medium, namely, in the definition of a density characteristic curve indicating a correlation between image information values (light quantities), which are correlated to light quantities which have entered a predetermined recording medium from an object (actual scene), and their corresponding density information values to be formed on the recording medium, basic variables (parameters) of the characteristic curve are not limited to a combination of the logarithmic value (light quantity) of each exposure and its corresponding density such as that explained above with respect to a color original image. For each production system of produced color images, it is only necessary to define, as a characteristic curve of a sensor which is a sensor of an input medium (recording medium) for image information of an object (actual scene), a density characteristic curve (photoelectric conversion characteristic curve) on which each density information value ($D_n$), which is correlated to a density in a broadest sense, and its corresponding image information value ($x_n$), having a correlation with a light quantity are correlated to each other.

A physical quantity which indicates an image information value correlated to this sort of density should be interpreted in a broadest sense, and its synonyms include, for example, reflection density, transmission density, luminance, brightness, frequency, current or voltage value, and so on.

Further, the recording medium on which the object (actual scene) is recorded can be a photosensitive material, or any one of photoelectric conversion devices such as a two-dimensional CCD, an optical disc, a magnetic disc, a magnetic tape and a photodiode.

Needless to say, in relation to the above-described recording medium, the density characteristic curve indicating characteristics of the recording medium can also be called a photographic density characteristic curve (in the case of a photosensitive material), a photoelectric conversion characteristic curve (in the case of a photoelectric conversion device), or the like.

Where the color original image is a reflection original (i.e., the reflection original is used as an actual scene), the above-described density characteristic curve is defined by a 45° linear line [i.e., $F(D)=F(X)$] in a rectangular coordinate system.

A description will next be made about the application field of the color separation technique according to the present invention in which the color tone control adjustment has been incorporated.

The present invention has been described especially in relation to the production of printed color pictures. The application of the present invention is however not limited to the production of such printed color pictures.

Namely, application examples of the color separation technique according to the present invention include:

(i) to express a gradation or color tone of a reproduced color image by the size of dots as seen in printed color pictures such as those printed by letterpress printing, lithographic printing, halftone gravure printing or silk screen printing as have already been described in detail (this application is called the "variable-area gradation method" or the "multivalued variable area gradation method");

but are not limited to this application but also include:

(ii) to express a gradation or color tone by changing the density of pixels themselves of a predetermined area, for example, the density of a pigment, dye (colorant) or the like covering pixels as seen in sublimation-transfer type thermal transfer pictures, (silver-salt utilizing) thermally-developed transfer pictures, conventional gravure pictures and the like (this application is called the "density gradation method" or "direct density gradation method");

(iii) to express a gradation by changing the recoding density, for example, the number of dots, the number of ink droplets or the like per unit area as seen in digital copying machines (color copiers and the like), printers (the ink jet type, the bubble jet type, and the like), and facsimile equipments (this application is similar to the variable-area gradation method described above under (i) and is also called the "variable-density gradation method", "pseudo-gradation method" or "binary-system variable-area gradation method");

(iv) to express an image by adjusting the intensity of luminance per unit area in accordance with electrical signals relating to image information such as video signals, television signals or high-definition TV signals, for example, to obtain CRT images or LC images or to form color prints, color hard copies or the like from these image expressions;

(v) to produce a reproduced color image faithful to an object (affected part or lesion) as a precise image for a medical check-up like an X-ray picture; and (vi) to show not only densities but also dot percents as in printing-related equipments such as densitometers equipped with a density gradation conversion system, pre-color-separation inspection equipments (e.g., proof color tables and color-separation education simulators.

The picture producing system according to the present invention, especially the features of the tonal conversion unit as the core system (i.e., the principal element) have been described above, taking as an example the tonal conversion unit of the color scanner which is used to produce printed color pictures.

For the reasons to be set out below, the picture producing system according to the present invention is however not limited to such a color scanner for the production of printed color pictures.

As is known well, there are a variety of methods as methods for expressing pixels of a halftone. Examples include the method in which the rate of covering of each pixel is changed depending on the size of dots (which is also called the "size modulation method" and is seen in monochromatic and color scanners for producing printed pictures, piezoelectric ink-jet printers and the like). Another example is the method in which the rate of covering of each pixel is changed depending on the number of specified dots (of the same size) arranged (which is also called the "density modulation method" and is seen in fusion-transfer printers and the like). Another example is the method in which the density of specified dots themselves (of the same size) is changed (which is also called the "direct density modulation method" and is seen in thermal sublimation-transfer printers; TV receivers constructed of a CRT or LCD which form an image by adjusting the luminances of pixels are also included in this category).

The above-described tonal conversion method of the present invention can be applied to picture producing systems which adopt the above-described various pixel-expressing methods. Namely, the picture producing system according to the present invention embraces equipments which adopt the above-described various pixel-expressing methods.

In other words, the picture producing system according to the present invention should be interpreted in a broadest sense and embraces all equipments provided with a function permitting production of reproduced color images such as duplicating equipments, printers, process (i.e., platemaking) equipments, image transmission equipments, image pickup TV equipments, and electronic camera equipments.

In each of the above-described various picture producing systems, it is obviously necessary to produce a reproduced color image by making values $y_n$ (halftone intensities), which are obtained by performing arithmetic processing in accordance with the above-described tonal conversion formula of the present invention, conform with the gradation-expressing method suited for the picture producing system (the variable dot method, the constant dot method, or the density-variable dot method) or the variable-luminance expressing method.

Figures 3A, 3B:
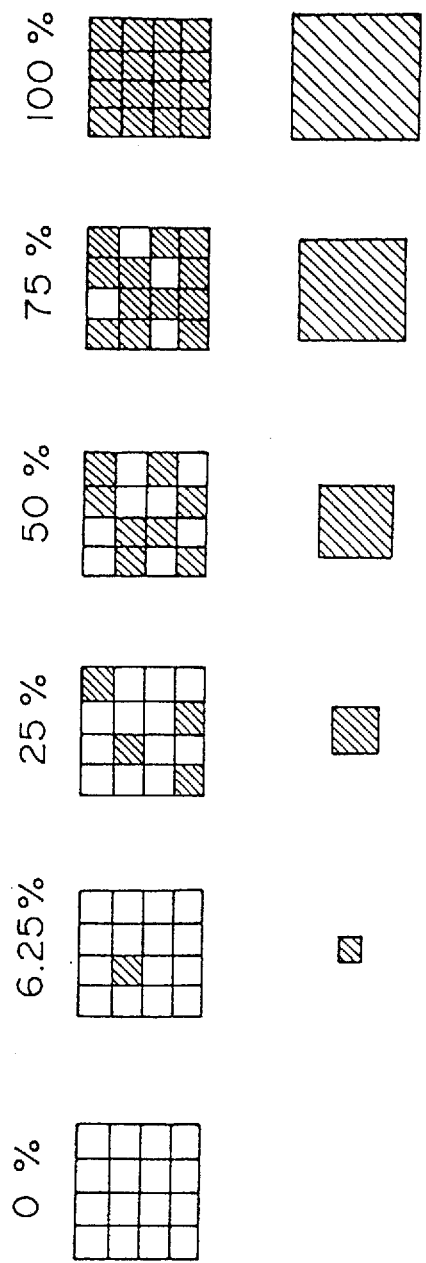
FIGS. 3A and 3B diagrammatically illustrate an expression method of gradations.

Reference is now had to FIGS. 3A and 3B. In the case of FIG. 3A, for example, the distribution of pixels to be recorded in a predetermined pixel block is set so that pixels take a mutually-scattered positional relationship within the pixel block as the number of pixels to be recorded increases. As an alternative, it may also be contemplated to distribute pixels, for example, in such a way that the pixels are successively spread out in the form of a vortex from a central part of the pixel block. In this case, pixels are similar to dots employed in a photomechanical process. In the case of FIG. 3B, dots of areas corresponding the corresponding to numbers of pixels in FIG. 3A, respectively, are shown.

The pixel block has been described as a pixel block of the 4×4 matrix type. By this pixel block, gradations of 17 stages can be expressed. A pixel block of the n×n matrix type can express gradations of $n^2+1$ stages (0 to 100%) in general.

The method for expressing the gradation of an original image of a continuous tone by a distribution of pixels formed by the above-described matrix-type pixel block is generally called the dither matrix method and is well known in the present field of art.

The picture producing system according to the present invention has a significant feature in the color separation technique to be performed especially at the tonal conversion unit. This color separation technique is incorporated with a function to convert a gradation and a function to adjust a color tone. Other features will hereinafter be described.

The picture producing system according to the present invention can use various color original pictures, namely, various color original images (medium images) formed by recording, photographing, or otherwise picking up through a conversion, objects (actual scenes) on desired recording media while using communication media such as light, electromagnetic waves or the like.

Examples of the above-described recording media for color original images include transparent color films (photosensitive emulsions), photoelectric conversion devices such as two-dimensional CCDs and photodiodes, optical discs, and magnetic discs.

Needless to say, reflection originals such as paintings and color prints can also be used as color original pictures.

To determine light quantities from density information values in the above-described various recording media, it is only necessary to use characteristic curves of the recording media, for example, a photographic density characteristic curve, a photoelectric conversion characteristic curve and the like.

Needless to say, for a reflection original such as a painting or color print, its characteristic curve can obviously be handled assuming that density information values and their corresponding light quantities linearly correspond to each other in a 1:1 relationship (i.e., corresponds in a 45° linear relationship).

As will be demonstrated by the below-described embodiments, the present invention can provide a picture producing system of high added value by specifying the inherent density characteristic curve (or photoelectric conversion characteristic curve) of a desired one of various recording media such as photodiode and CCD, said recording medium forming the above-described recording medium system, while using the performance of the conventional recording medium. In other words, the present invention can produce reproduced color images having quality (density gradation and color tone) far superior to conventional reproduced color images by using such conventional recording media.

Namely, a great deal of efforts have been exercised in the present field of art to improve the characteristics (photosensitive characteristics and photoelectric conversion characteristics) of various recording media with a view to producing reproducing color images of high quality (for example, to attain a high dynamic range and to retain the linearity of each characteristic curve). When reproduced color images are produced in accordance with the present invention, it is not absolutely required to make various recording media sophisticated or to provide them with higher performance, and recording media of conventional performance (characteristics) can be satisfactorily employed. This is attributable to the tonal conversion technique incorporated in the picture producing system according to the present invention, and constitutes another significant feature of the present invention.

A description will next be made of methods for applying the color separation technique according to the present invention, in which the color tone control or adjustment technique has been incorporated, to various equipments (picture producing systems) which are used to produce reproduced color images. Namely, a description will be made of the construction of the tonal conversion unit, which is a principal element (system) in the picture producing system according to the present invention and performs color separation while conducting adjustment of a gradation and adjustment of a color tone in combination.

1. In the present invention, the above-described tonal conversion unit can be constructed, for example, as will be described next. Namely, the tonal conversion unit is constructed to be equipped with:

(1) a system (in a software-reflected form) for determining image information values, which are correlated to light quantities corresponding to image information values and/or image information electrical signal values (either analog or digital) relating to densities of a color original image (either a hard original or a soft original), on the basis of a characteristic curve defining a correlation between density information values obtained from a color original image recorded on a predetermined recording medium (sensor) and image information values correlated to light quantities which have entered the recording medium (sensor) form an object (actual scene); and (2) a system (in a software-reflected from) for applying the above-described tonal conversion system.

2. Further, an output unit can be constructed to output a reproduced color image of a halftone, with a gradation and a color tone adjusted as desired, by controlling the value of a current or voltage to a recording unit (recording head) of the unit or the impression time thereof in accordance with values calculated by the above-described tonal conversion formula, namely, values $y_n$ (halftone intensities) to change the size of dots or the density of arrangement of dots.

In the present invention, the values $y_n$ can also be called "dot percents" in relation to the reproduction technique of printed color pictures. However they are generally called "halftone intensities" as described above. The values $y_n$ as used herein should therefore be interpreted in a broadest sense irrespective of their nomenclature.

For example, when original plates for printed color pictures as halftone images, namely, original printing plates (color plate images) are produced, an existing system known well in the present field of art can be used. Accordingly, it is only necessary to incorporate the above-described tonal conversion unit of the present invention in the color separation system of a commercially-available electronic color separation system (e.g., a color scanner or a total scanner).

The picture producing system according to the present invention can be constructed using various existing picture producing systems including the above-described color separation system (e.g., a color scanner or a total scanner).

More specifically, in a well-known existing system which produces a reproduced color image by irradiating small spot light onto a color film original image (transparent medium image), receiving transmitted light (image information signals) at a photoelectric conversion unit (e.g., a photomultiplier or CCD), converting the light intensities into corresponding voltage levels, digitizing the thus-obtained image information electrical signals (voltage values) at a tonal conversion unit, subjecting the thus-obtained digital signals to desired straightening and processing by a computer, actuating an output unit on the basis of halftone intensities outputted from the computer and then jetting out inks onto a sheet of recording paper in unison with an input system. Replacement of the above tonal conversion unit by the tonal conversion unit of this invention constitutes the picture producing system according to the present invention.

In the case of a color separation system (e.g., a color scanner), it is only necessary to reconstitute a calculating and processing unit (tonal conversion unit) of a computer. The calculating and processing unit is adapted to perform straightening and processing of electrical signals as image information on a color original image (medium image). Incorporated in the calculating and processing unit is software which determines light-quantity-correlated image information values from density information values of the color original image (medium image) recorded on a color film (recording medium) in accordance with the density characteristic curve of the color film (recording medium). The calculating and processing unit then outputs dot percents ($y_n$) adjusted in gradation and color tone by the tonal conversion formula.

In a conventional system, a color original image (i.e., a medium image photographed and recorded on a recording medium as a photosensitive material) is processed, as is appreciated from the above description, at an image information input system (detection unit) of a picture producing system, specifically at a photoelectric conversion unit (a photomultiplier or CCD), whereby image information values correlated to densities are obtained. Strictly speaking, the photoelectric conversion unit has its own characteristic curve (photoelectric conversion characteristic curve). Accordingly, at the photoelectric conversion unit, the above-described image information on the color original image is affected (modified or deteriorated)by the photoelectric conversion characteristic curve of the photoelectric conversion unit. Nonetheless, influence of the above photoelectric conversion characteristic curve can be ignored although it is preferred to eliminate its influence.

The above-described software applied to the tonal conversion unit can take various forms, including a general-purpose computer which converts density information values ($D_n$), correlated to densities of a color original image, into image information values ($x_n$), correlated to corresponding light quantities in accordance with a predetermined density characteristic curve. The computer holds an algorithm of the above-described tonal conversion formula as software and also has an interface for A/D (analog-digital conversion) and D/A (digital-analog conversion). The tonal conversion unit can also be embodied as an electrical circuit embodying the algorithm as a logic by a general-purpose IC, an electric circuit containing an ROM with the results of algorithmic processing held therein, a PAL, gate array or custom IC embodying the algorithm as an internal logic.

As modularization has been developed, especially in recent years, the computation system, which can perform tonal conversion of an image on the basis of the above-described tonal conversion formula according to the present invention, can be easily fabricated as a module such as a specially-designed IC, LSI, microprocessor or microcomputer.

Scanning is then performed by successively dividing the photoelectric scanning spot light into spots and, at the same time, a laser exposure unit for irradiating a laser beam onto a raw film is operated in synchronization with the scanning. This makes it possible to rationally produce an original printing plate (color plate image) which has dot percents ($y_n$) derived by the tonal conversion formula and is of a halftone adjusted in gradation and color tone as desired.

Next, a specific description will be made about certain matters which are relevant to the development of the color tone adjustment function at the tonal conversion unit of the picture producing system according to the present invention.

Instead of adopting the approach that, as in the case of production of a printed color picture, individual color plates (C/M/Y/BL) are produced and overprinting is performed through the color plates, the picture producing system has adopted the approach that the individual colors are successively over printed under a sequence control. However, for the sake of convenience of description, the term "color plate images" which, regards image of individual colors as still images, will be used in the subsequent description. In relation to the use of the term "color plate images", terms such as "C-plate image (color plate images)" and "C-plate separation curve (tonal conversion curve)," will be used in the subsequent description.

(1) Determination of the color Tone Control Point ($M_1$)

The color tone control point ($M_1$) can be any desired point between the H area and the S area. In a printed monochromatic picture or a printed color picture, however, a point of an intermediate tone for the reproduction of a high-quality gradation, more specifically, a point where the dot percent of the C-plate image (color plate image) becomes 50% is widely adopted as the control point.

In the picture producing system according to the present invention, it is therefore also preferred to choose a point where the halftone intensity ($y_n$) is 50% on the C-plate color separation curve (tonal conversion curve).

The above-described color tone control point ($M_1$) conforms with standard conditions for maintaining a gray balance upon production of a printed color picture (see Table 2). Needless to say, the color tone control point ($M_1$) in the present invention is not limited to the point where the halftone intensity ($y_n$) is 50%, as described above.

(2) Light Quantity (x) at the Color Tone Control point ($M_1$)

The light quantity (x) at the color tone control point ($M_1$) can be set as will be described below.

It is preferred to set a standard color separation curve (tonal conversion curve) for a standard one of the individual color plates in the picture producing system and then to set color separation curves for the remaining color plates in relation to the color separation curve for the standard color plate so that the gray balance and color balance can be maintained. This approach is the same as that adopted upon production of a printed color picture.

As in color printing technology, the C plate is therefore chosen as the standard color plate. The color separation curve (tonal conversion curve) for the C plate is set by applying the tonal conversion formula under the following conditions:

(i) a desired γ value, for example, γ=0.45 as adopted upon production of the printed color picture; and (ii) desired $y_H$, $y_S$ and a values, for example, $y_H$=0%, $y_S$=95% and α=1.00 as adopted upon production of the printed color picture.

It is next only necessary to determine a light quantity (x) which gives $y_n$=50% on the C-plate color separation curve (tonal conversion curve) set as described above.

Namely, it is only necessary to solve the following formula by introducing the above-described conditions into the tonal conversion formula. In this case, a light quantity of x=0.40 is obtained.

$$50=0+[(1-10^{-0.45x})(95-0)/(1-10^{-0.45})]$$

(Note)

Upon application of the tonal conversion formula, $x_S-x_H$ was set at 1.000 ($x_S-x_H$=1.000).

In general, the dynamic range ($x_S-x_H$) of light quantities obtained from a color original image (medium image) is not 1.00. However, the dynamic range normalized at 1.00 is used here.

Needless to say, the normalization of the dynamic range to 1.00 causes no problem in processing an image because the quality of the image changes proportionally.

(3) Determination Method of Values γ to Set Color Separation Curves for the Individual Color Plates (C/M/Y/BL)

As has been described above, the value γ for setting the C-plate color separation curve (tonal conversion curve) has been set at 0.45 (γ=0.45) as described above.

With respect to the remaining color plates, the values γ for setting their respective color separation curves have to be determined in accordance with the details of conditions for the adjustment of color tones.

In the case of the M plate, for example, when at the color tone control point ($M_1$) [incidentally, the light quantity at the above color tone control point is 0.40 (x=0.40)], the halftone intensity ($y_n$) of the M plate is 20% and as initial conditions, the halftone intensity is from 0% to 68% [i.e., the halftone intensity at the H area is 0% and that at the S area is 68%], these values are introduced into the above tonal conversion formula to determine the value γ for the M plate. Namely, γ=0.20 is obtained by the following formula:

$$20=0+[(1-10^{-\gamma(0.40)})(68-0)/(1-10^{-\gamma})]$$

In the picture producing system according to the present invention, it is only necessary to load the above-described tonal conversion unit with software which automatically calculates the light quantity at the above-described color tone control point ($M_1$) and the values γ for the individual color plates and which prepares desired color separation curves.

EXAMPLE 1

The color separation method according to the present invention, which can perform adjustment of a gradation and adjustment of a color tone in combination, will hereinafter be described in further detail.

In this example, a printed color picture (reproduced image) is produced from a color original image (medium image). It should however be borne in mind that the application field of the present invention is not limited thereto.

To investigate whether or not the gradation and color tone of the printed color picture can be rationally controlled or adjusted by using the tonal conversion formula of this invention as an important tool, the following 3-stage experiments were conducted:

(1) Basic experiment (2) Application experiment (3) Practical application experiment.

To scrutinize influence and effects which may be brought about by the incorporation of the adjustment or control of a color tone in the tonal conversion formula which is a useful tool as a tonal conversion technique, the above 3-stage experiments were each conducted by the following two methods:

(1) Experiment A: an experiment for adjusting the dot percents at both the color tone control point ($M_1$) and the S area in each of the three color plate images (C plate/M plate/Y plate).

(2) Experiment B: an experiment for adjusting only the point $M_1$ in each of the three color plate images (C plate/M plate/Y plate).

<Determination methods of the point $M_1$, the light quantity at the point $M_1$ and the values γ for the individual color plates>

(1) Color Tone Control Point ($M_1$)

The color tone control point ($M_1$) (see FIG. 2) was set at a point of an intermediate tone adopted widely for the adjustment of a gradation in the conventional art, more strictly speaking, at a point where the dot percent of the C-plate halftone image (color plate image) was 50%.

This color tone control point is in registration with the control point for controlling the gray balance which is widely adopted in the present field of art.

Needless to say, the color tone control point ($M_1$) is not limited to the position where the dot percent of the C plate is 50%.

(2) Light Value at the Color Tone Control Point ($M_1$)

The value of the color quantity at the color tone control point ($M_1$) was determined in accordance with the tonal conversion formula for the setting of the C-plate color separation curve (tonal conversion curve).

Namely, with respect to the tonal conversion formula for the setting of the C-plate color separation curve, the following conditions were introduced in the tonal conversion formula to determine the value x (i.e., the light quantity at the color tone control point):

Used dot range: 0 to 95% ($y_H$=0%, $y_S$=95%)

Value γ: 0.45

$x_S$=1.00, $x_H$=0.00 ($x_S$−$x_H$=1.00)

$y_n$=50(%) [this is the dot percent at the above-described color tone control point ($M_1$)].

Namely, the above-described conditions were introduced into the tonal conversion formula and the following formula was solved. As a result, x was found to be 0.40 (x=0.40).

$$50=0+[(-10^{-0.45x})(95-0)/(1-10^{-0.45})]$$

In general, the dynamic range ($x_S$−$x_H$) of light quantities obtained from a color original image (medium image) is not 1.00. However, the dynamic range normalized at 1.00 is used here.

Needless to say, the normalization of the dynamic range to 1.00 causes no problem in processing an image because the quality of the image changes proportionally.

(3) Determination method of Values γ to Set Color Separation Curves for the Individual Color Plates (C/M/Y/BL)

As has been described above, the value γ for setting the C-plate color separation curve has been set at 0.45 (γ=0.45) as described above.

With respect to the remaining color plates, the values γ for setting their respective color separation curves (tonal conversion curves) have to be determined in accordance with the details of conditions for the adjustment of color tones.

In the case of the M plate, for example, when at the color tone control point ($M_1$) [incidentally, the light quantity at the above color tone control point is 0.40 (x=0.40)], the dot percent of the M plate is 20% and the used dot range is from 0% to 68%, the value γ can be determined by solving the following formula. Incidentally, the solution of the following formula is γ=20.

$$20=0+[(1-10^{-\gamma(0.40)})(68-0)/(1-10^{-\gamma})]$$

In this experiment, software was used. It automatically calculated the light quantity at the above-described color tone control point ($M_1$) and the values γ for the individual color plates and also automatically prepared desired color separation curves.

<Equipments and Materials Employed in the Experiments>

(1) Chosen as a color original image was a picture of a brown china pot of standard quality photographed with a 4"×5" positive color film made by Eastman Kodak Company.

(2) Used as a color scanner was a "Digital Color Scanner Model 45" manufactured by ISOMET Company, which had a tonal conversion unit loaded with:

software for determining a light quantity (normalized light quantity) from a density value in accordance with a photographic density characteristic curve (twelve characteristic curves of representative photosensitive materials such as "FUJI CHROME", "AGFA CHROME" and "EKTA CHROME" were provided), and software for performing control of a color tone by using the tonal conversion formulas, and software for calculating color separation curves.

(3) Employed as a color separation file was "AGFA S712P".

(4) Adopted for color correction was the "Cromalin System" of E.I. du Pont de Nemours & Company.

<Basic Experiment>

Shown in Table 3 are plate-making design information of individual color plates employed for the control or adjustment of a color tone in the basic experiment.

(Note 1) Experiment A was conducted by first designating the dot percent of the S area and then determining the dot percent at the point $M_1$ in accordance with the below-described formula (1). Incidentally, standard dot percents for the below-described formula (1) are sown in Table 2.

Dot percent at the point $M_1$ = (1)
(the standard dot percent for the point $M_1$) × (the dot percent designated for the S area)/(the standard dot percent for the S area)

(Note 2) In Experiment B, employed as the dot percent at the point $M_1$ was the corresponding value in Experiment A, and adopted as the dot percent of the S area was the standard value (see Table 2).

(Note 3) Since a catch light area was chosen as the H area of the color original image (of the pot), the dot percents of the H areas in all the color plate images were "0" (zero).

TABLE 3

Design Information on Color Tone Adjustment Plates for Basic Experiment

| Test No. | Color plate | Experiment A H | $M_1$ | S | Experiment B H | $M_1$ | S |
|---|---|---|---|---|---|---|---|
| 1 | C | 0 | 50 | 95 | 0 | 50 | 95 |
|  | M | 0 | 31 (40 × 70/90 = 31.1) | 70 | 0 | 31 | 90 |
|  | Y | 0 | 36 (40 × 80/90 = 35.6) | 80 | 0 | 36 | 90 |
| 2 | C | 0 | 50 | 95 | 0 | 50 | 95 |
|  | M | 0 | 27 (40 × 60/90 = 26.6) | 60 | 0 | 27 | 90 |
|  | Y | 0 | 31 (40 × 70/90 = 31.1) | 70 | 0 | 31 | 90 |

The results of the above-described four experiments [Experiment A (No. 1 and No. 2) and Experiment B (No. 1 and No. 2)] of the basic experiment were all as expected in light of the practice (experiences) of plate making. This indicates that the color tone control method according to the present invention, which makes use of the tonal conversion formula, has rationality.

Details of the four color-corrected images obtained from the basic experiment were as follows:

(1) In all the four images, the gradation (density gradation) was reproduced well over the entire dynamic range from the H area to the S area, and the emphasis of the intermediate tone was also appropriate to the human visual sense.

(2) The color tone of the pot was bluish in Experiment A (No. 1 and No. 2), and in Experiment B (No. 1 and No. 2), it was bluish in the intermediate tone range and brownish at the S area as in the original image. These color tones were fully consistent with the practice of plate making.

Incidentally, the following are γ values for setting color separation curves for the individual color plates and dot percents at the point $M_1$ (calculated values):

(1) Experiment A (No. 1) C plate: γ=0.45, dot percent at $M_1$=50.000% M plate: γ=−0.20, dot percent at $M_1$=30.9878% Y plate: γ=−0.18, dot percent at $M_1$=35.8678%

(2) Experiment B (No. 2) C plate: γ=0.45, dot percent at $M_1$=50.000% M plate: γ=−0.18, dot percent at $M_1$=26.9006% Y plate: γ=−0.20, dot percent at $M_1$=30.9878%

Incidentally, the value γ for the BL plate was −0.25 (γ=−0.25).

Figure 2:
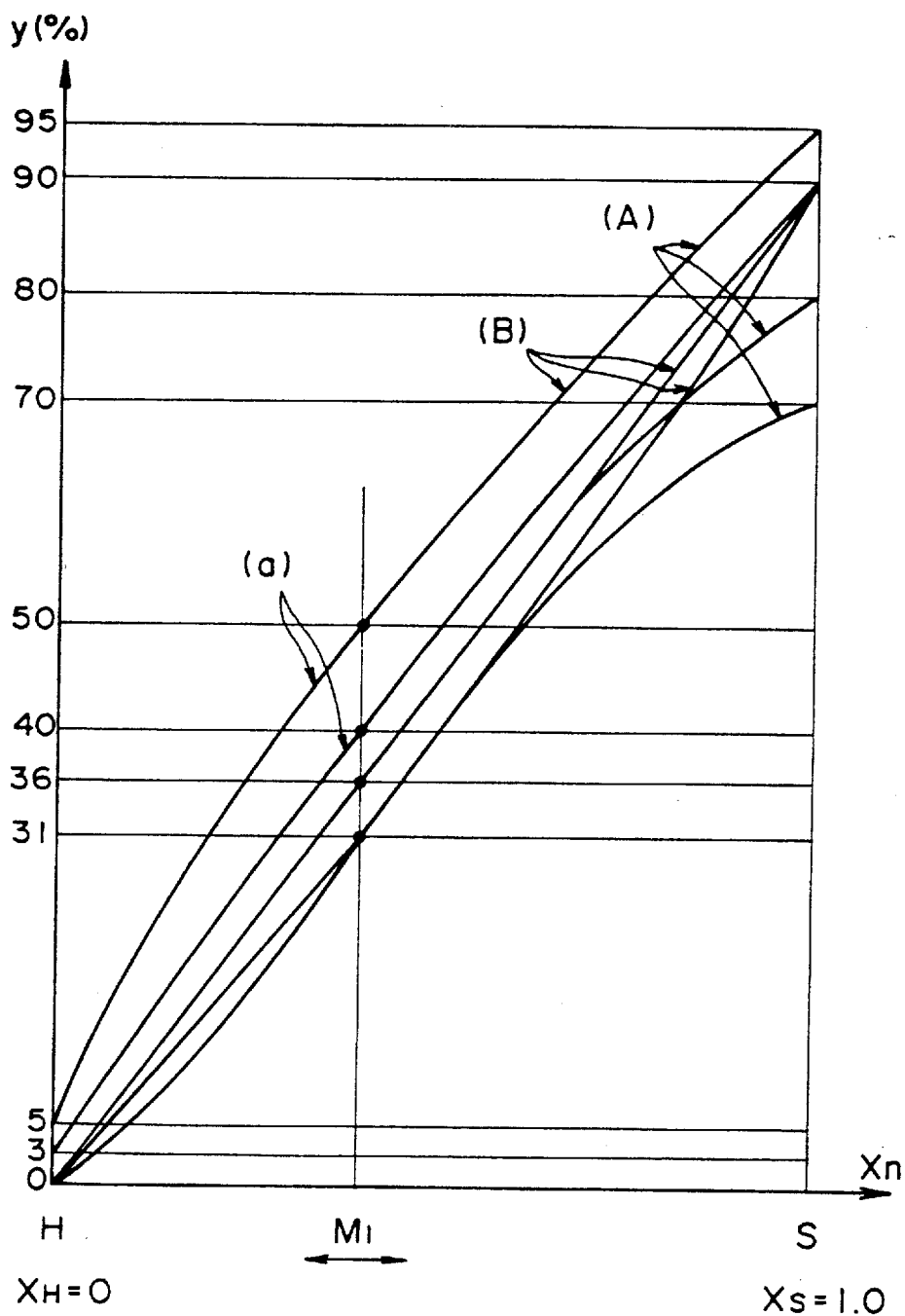
FIG. 2 is a diagrammatic representation of an outline of a basic experiment according to the present invention and a color separation curve employed in the basic experiment.

Further, the outline of the above basic experiment and the color separation curves (tonal conversion curves) employed in Experiment B (No. 1) for the individual color plates are shown in FIG. 2.

In the diagram, (a) indicates a combination of color separation curves adopted as standards in the present field of art for maintaining the gray balance. Its plate-making design information is shown in Table 2.

In the diagram, (A) designates a combination of color separation curves (tonal conversion curves) for the individual color plates in Experiment A (No. 1), while (B) indicates a combination of color separation curves (tonal conversion curves) for the individual color plates in Experiment B (No. 1).

<Application Experiment>

It is the object of this experiment to confirm, by conducting a color separation experiment by a method closer to a daily color separation work, whether or not the color tone control method of the present invention making use of the tonal conversion formula is equipped with ability to rationally adjust or control a color tone of a printed color picture.

In this experiment, the control point ($M_1$) for a color tone was set at a point where the dot percent of the C-plate image was 50%.

As a basic scale for indicating, by dot percents of the individual colors C/M/Y of the respective color plate images, details of color tone adjustment at the above-descried color tone control point ($M_1$) (specific details of a correction or modification of the color tone required by users, the "DIC GRAF-G Color Chart", 2nd edition published March, 1991 by Dainippon Ink & Chemicals, Incorporated, was adopted.

In this experiment, 6 types of colors were selected from the above color chart.

In Table 4, the six types of colors selected from the above-mentioned "DIC GRAF-G Color Chart" and the dot percents designated for the adjustment of the color tone are shown.

In the color chart, the above-mentioned six types of colors are each shown in 12 stages as dot densities of C and M between 0 and 100 and are shown as colors obtained by printing Y/BL (which had a given dot density, for example, a dot density of 10% or 50% as shown in Table 4.

Accordingly, a designated dot percent for the adjustment of a color tone can be easily selected in the chart. Table 4 shows these designated dot percents.

Needless to say, it is an object of this experiment to investigate whether or not a color tone designated by the above-mentioned dot percent can be faithfully reproduced on each color plate image without causing a deterioration in the gradation.

TABLE 4

Six Types of Colors Selected from Color Chart and Designated Dot Percents for Color Tone Adjustment

| Test No. | Color | Page | DIC GRAF-G Color Chart C | M | Y | BL | Designated dot percent for color tone adjustment C | M | Y | BL |
|---|---|---|---|---|---|---|---|---|---|---|
| a-1 | blue | 17 | 0-100 | 0-100 | 10 | 10 | 50 | 20 | 10 | 10 |
| a-2 | blue | 29 | 0-100 | 0-100 | 10 | 30 | 50 | 20 | 10 | 30 |
| b-1 | light yellow | 19 | 0-100 | 0-100 | 50 | 10 | 50 | 20 | 50 | 10 |
| b-2 | light yellow | 31 | 0-100 | 0-100 | 50 | 30 | 50 | 20 | 50 | 30 |
| c-1 | blue | 24 | 0-100 | 0-100 | 30 | 20 | 50 | 20 | 30 | 20 |
| c-2 | light yellow | 25 | 0-100 | 0-100 | 50 | 20 | 50 | 10 | 50 | 20 |

Plate-making design information for the present experiment, which has been prepared based on the information of Table 4, is shown below in Table 5.

(Note 1) Needless to say, the designated dot percents for color tone adjustment shown in Table 4 were adopted as designated dot percents for the point $M_1$ in this experiment.

(Note 2) In Experiment A of this experiment, M- and Y-plate dot percents for their S areas were determined by the below-described formula (2).

For the S area of the C plate, the value (95%) in Table 2 (Standard Values for the Maintenance of Appropriate Gray Balance) was adopted. Incidentally, standard dot percents for the formula (2) are shown in Table 2. Further, the standard dot percents were adopted when calculation results by the formula (2) exceeded the standard dot percent.

$$\text{Dot percent at the S area} = \frac{(\text{the standard dot percent for the S area}) \times (\text{the dot percent designated for } M_1)}{(\text{the standard dot percent for } M_1)} \quad (2)$$

(Note 3) Since a catch light area was chosen as the H area of the color original image (of the pot), the dot percents of the H areas in all the color plate images were "0" (zero).

(Note 4) The BL (black) plate was of the skeleton type under the routine practice, namely, the starting point (SP) of inking was designated at the point $M_1$ while the end point (EP) of inking was designated as the S area. Further, the maximum dot percent of the BL plate, which was placed at the S area, was set at 80% in Experiment A and 70% in Experiment B.

TABLE 5

Plate-Making Design Information for Color Tone Adjustment (for Application Experiment)

| Test No. | Color plate | Experiment A | | | Experiment B | | |
|---|---|---|---|---|---|---|---|
| | | H | $M_1$ | S | H | $M_1$ | S |
| a-1 (blue) | C | 0 | 50 | 95 | 0 | 50 | 95 |
| | M | 0 | 20 | 45 (90 × 20/40 = 45.0) | 0 | 20 | 90 |
| | Y | 0 | 10 | 23 (90 × 10/40 = 22.5) | 0 | 10 | 90 |
| | BL | — | 10 | 80 | — | 10 | 70 |
| a-2 (blue) | C | 0 | 50 | 95 | 0 | 50 | 95 |
| | M | 0 | 20 | 45 (90 × 20/40 = 45.0) | 0 | 20 | 90 |
| | Y | 0 | 10 | 23 (90 × 10/40 = 22.5) | 0 | 10 | 90 |
| | BL | — | 30 | 80 | — | 30 | 70 |
| b-1 (LY)* | C | 0 | 50 | 95 | 0 | 50 | 95 |
| | M | 0 | 20 | 45 (90 × 20/40 = 45.0) | 0 | 20 | 90 |
| | Y | 0 | 50 | 23 (90 × 10/40 = 22.5) | 0 | 50 | 90 |
| | BL | — | 10 | 80 | — | 10 | 70 |
| b-2 (LY)* | C | 0 | 50 | 95 | 0 | 50 | 95 |
| | M | 0 | 20 | 45 (90 × 20/40 = 45.0) | 0 | 20 | 90 |
| | Y | 0 | 50 | 90 (90 × 50/40 = 112.5) | 0 | 50 | 90 |
| | BL | — | 30 | 80 | — | 30 | 70 |
| c-1 (blue) | C | 0 | 50 | 95 | 0 | 50 | 95 |
| | M | 0 | 20 | 45 (90 × 20/40 = 45.0) | 0 | 20 | 90 |
| | Y | 0 | 30 | 68 (90 × 30/40 = 67.5) | 0 | 30 | 99 |
| | BL | — | 20 | 80 | — | 20 | 70 |
| c-2 (LY)* | C | 0 | 50 | 95 | 0 | 50 | 95 |
| | M | 0 | 10 | 23 (90 × 10/40 = 22.5) | 0 | 10 | 90 |
| | Y | 0 | 50 | 90 (90 × 50/40 = 112.5) | 0 | 50 | 90 |
| | BL | — | 20 | 80 | — | 20 | 70 |

*LY: light yellow

The results of the above application experiment were all as expected as in the above-described basic experiment.

The color tone at the color tone control point ($M_1$) obtained in a pritned color picture was fully consistent with the color tone on the color chart as the basic scale and over the entire dynamic range from the H area to the S area, not only the gradation but also the color tone were natural to the human visual sense.

Namely, from the results of the above application experiment, the color separation technique according to the present invention, which makes use of the tonal conversion formula as a tool, has been confirmed to have rationality in performing control or adjustment of a color tone and also in performing adjustment of a gradation and adjustment of a color tone in combination.

<Practical Application Experiment>

In view of recently increasing work by printing designers and the like to darely modify the finished tone of a reproduced printed color picture as a whole into a color tone such as a blue tone, dark green tone, light green tone, pink tone or sepia tone despite use of a color original image of standard quality and also in view of the current situation that the conventional art requires to go through plural complex work steps totally on the basis of experienced skill upon modifying the color tone of an image as a whole as described above, this practical application experiment performed an experiment on the effectiveness of the gradation and color tone control or adjustment method of the present invention for such work.

Namely, it was confirmed whether or not the application of the gradation and color tone control or adjustment method of the present invention would make it possible to modify the color tone of the image as a whole and also to rationally control the gradation of the image.

The color original image for the above experiment was chosen from transparent color originals of 4"×5" size which were manufactured by Company F and are recognized as standard color originals in the present field of art. Described specifically, chosen as the standard color original image was one showing an image of a young lady and several kinds of materials (metal, fabric, flower, paper, etc.) and containing a variety of colors such as red, blue, green, yellow and purple.

At the same time, another experiment was also conducted on a transparent target of 4"×5" (a color original image prepared in accordance with the ISO standards) which was produced by AGFA AG and is widely used as a reference target in the present field of art.

The finished color tone of each reproduced printed color picture was modified into a blue tone as a whole.

Specifically, the color tone was controlled by the designated color of C plate: 50%, M plate: 30%, Y plate: 10% and BL plate: 30% on page 29 of the DIC GRAF-G color chart. The equipments, materials and the like which were used in this experiment were the same as those described above.

Plate-making design information for this experiment is shown below in Table 6. Further, data for setting a color tone curve for C plate are presented in Table 7.

Upon preparation of the plate-making design information of Table 6, the following matters were taken into considered in view of the results of the above-described application experiment.

(1) Attention was paid so that the image expressing ability and effects of the BL plate would be fully used to give an emphasis to the finished quality of the blue tone of the entire color original image while keeping colors such as red, gray, green, yellow and purple natural in the image.

(2) To this end, the SP (starting point=0%) of the BL plate was set at a point where the dot percent of the C plate was 10%, 30% was set for the control point ($M_1$), and the maximum dot percent at the S area was set at 95%.

Further, the value $\zeta$ for setting a separation curve for the BL plate, that is, the value $\gamma$ for the tonal conversion formula was set at 0.10.

TABLE 6

Plate-Making Design Information for Color Tone Adjustment (for practical Application Experiment)

| Color plate | H | $M_1$ | s | value γ |
|---|---|---|---|---|
| C | 5 | 50 | 95 | γc 0.45 |
| M | 3 | 30 | 68 (90 × 30/40 = 67.5) | γm 0.15 |
| Y | 3 | 10 | 23 (90 × 10/40 = 22.5) | γy −0.10 |
| BL | — | 30 | 95 | γbl 0.10 |

TABLE 7

C-Plate Design Information
(for Practical Application Experiment)
H = 5%, S = 95%, γc = 0.45
Color original image
(standard original produced by F Company)

| Step No. | Density of original ($D_n$) | Light quantity ($X_n$) | Basic light quantity ($X_n - X_H$) | Normalized light quantity (Y) | Dot percent |
|---|---|---|---|---|---|
| 1(H) | 0.3100 | 1.3333 | 0.0000 | 0.0000 | 5.0000 |
| 2 | 0.9175 | 1.9125 | 0.5792 | 0.3777 | 50.1761 |
| 3 | 1.5250 | 2.2928 | 0.9595 | 0.6257 | 71.5487 |
| 4 | 2.1325 | 2.6005 | 1.2672 | 0.8263 | 85.2382 |
| 5(S) | 2.7400 | 2.8668 | 1.5335 | 1.0000 | 95.0000 |

As a result of the experiment, a printed color picture was obtained with a color tone and a gradation both as planned by the plate-making design.

Described specifically, the finished quality of the whole picture as felt to the visual sense had a blue tone and was extremely natural. Although the overall color tone of the image of the lady was blue, the delicate gradation inherent to the skin color had quality sufficient to reflect her real skin color even under the blue tone.

More strictly describing the results of the above experiment, the color tone from the H area to the intermediate tone was of the same blue tone as the color tone designated on the color chart. In the region of the S area, it looked that magenta (M) color remained. This can be attributed to the designation of a large dot percent (68%) for the S area of the M plate as is evident from the plate-making design information (data) in Table 6. The results of the experiment was fully consistent with the designated dot percent.

Further, colors such as red, green, yellow and purple were maintained mild so that they did not look incompatible with the quality of the whole image.

In addition, the whole gradation ranging from the H area to the S area was not impaired at all and through the overall blue tone, expressed gradation changes specific to materials such as the metal, fabric, flow and the like. Hence, those materials were clearly distinguished and their details (minute structures) were reproduced well.

Further, the printed color picture obtained from the standard target of AGFA also had a high-quality gradation although the picture had the blue tone as a whole.

Namely, the visual feeling of the quality of the blue tone received from the whole picture was extremely natural and balanced like visual feeling available when a natural scene is seen through a blue filter. This substantiates that the tonal conversion was rationally performed in the course of the overall conversion of the color tone.

EXAMPLE 2

The picture producing system according to the first embodiment of the present invention will be described with reference to FIG. 4.

Figure 4:
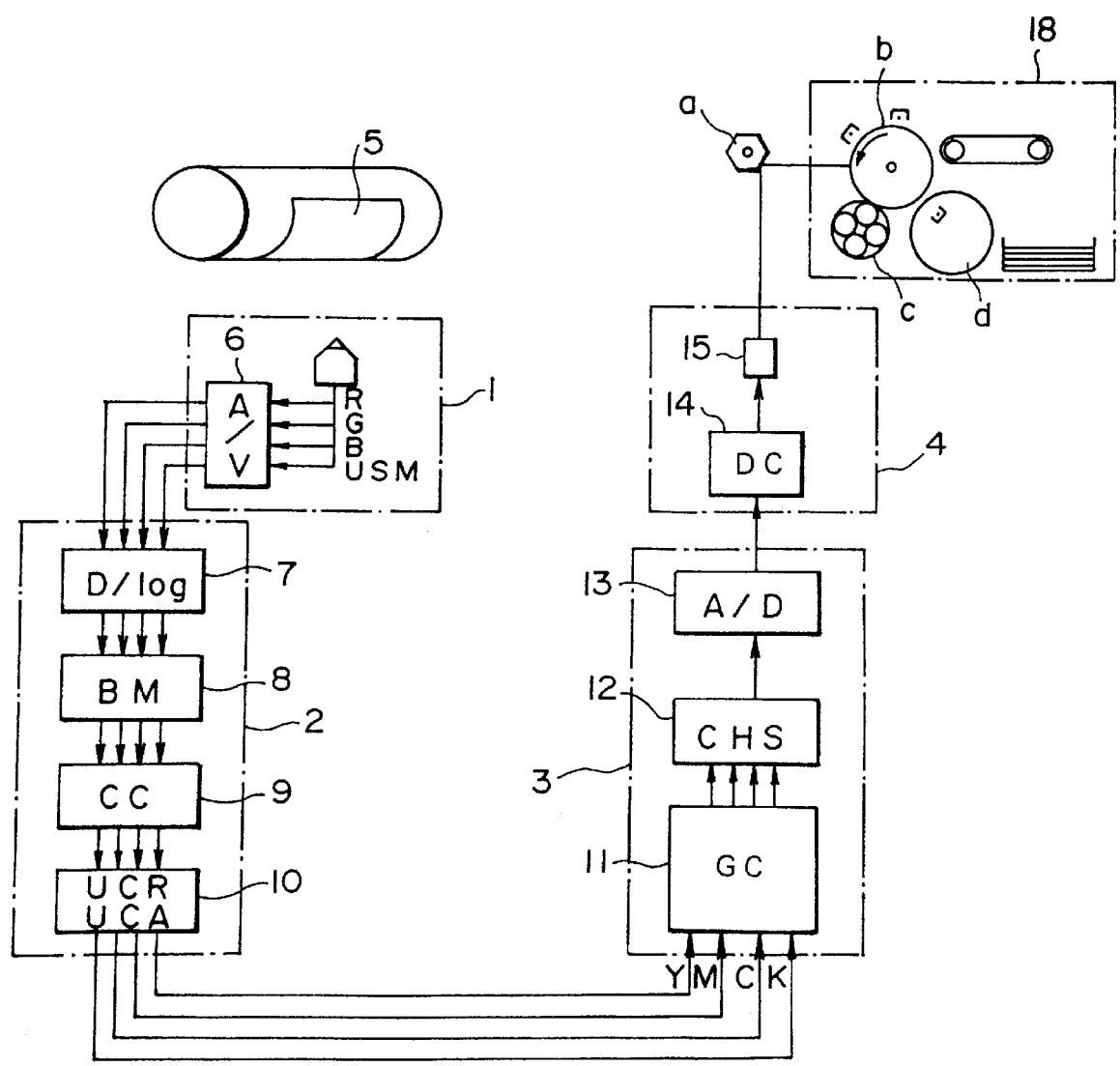
FIG. 4 is a block diagram of a picture producing system according to a first embodiment of the present invention.

As is shown in FIG. 4, the picture producing system according to the first embodiment of the present invention is constructed of four blocks. A detection unit 1 is provided for reading transmitted light or reflected light of a color original image by spectroscopically separating it into R (red), G (green) and B (blue). A color separation unit 2 for converting output signals from the detection unit 1 into color separation signals of C (cyan), M (magenta), Y (yellow) and K (black) (hereinafter, "K" will be used as a symbol instead of "BL"), a gradation adjusting unit 3 for processing the color separation signals in accordance with the above-described tonal conversion formula of the present invention to produce an appropriate halftone image. A output unit 4 is provided for exposing an electrophotographic sensitive body to a laser beam on the basis of output signals from the gradation adjusting unit 3. The electrophotographic sensitive body is part of a transferring unit 18.

Further, as is depicted in the drawing, the laser beam outputted from the output unit 4 is polarized by a polygon mirror a which is rotating at a high speed, whereby a latent image is formed on the photosensitive body b. This latent image is developed by a developing unit c. The image so developed is transferred onto a supplied recording sheet via a transfer cylinder d and is then fixed by a fixing unit.

To form a color image, it is necessary to arrange an independent photosensitive body and developing unit for each color component and to successively transfer separately-formed toner images onto a recording sheet. As an alternative, it is necessary to adopt procedures which repeat, with respect to individual color components, a process in which a latent image for a color component is formed on a single photosensitive body. The latent image is developed into a toner image and the toner image is then transferred onto a recording sheet.

In the present invention, of the four blocks 1–4 the detection unit 1, the color separation unit 2 and the output unit 4 have corresponding mechanism or constitutions which are generally employed in conventional picture producing systems and can therefore be used as they are. In other words, the gradation adjusting unit 3 has been subjected to improvements in accordance with the present invention.

Strictly speaking, the tonal conversion unit which is based on the above-described tonal conversion formula for performing color separation while conducting adjustment of a gradation and adjustment of a color tone in combination, also takes part in making improvements in the function of the color separation unit 2.

It is therefore possible to say that the picture producing system according to the present invention can be constructed by changing the constitution of a conventional tonal conversion unit to that of the tonal conversion unit according to the present invention while using a color separation unit 2 of a conventional picture producing system.

The constitution of the picture producing system according to the present invention will hereinafter be described specifically.

The above-described detection unit 1 detects transmitted light or reflected light from each portion of a color original image 5 by a photoelectric conversion device such as a photomultiplier and outputs signals R,G,B,USM as current values. These signals are converted to voltage signals at an A/V conversion unit 6.

In the color separation unit 2, the electrical signals R,G, B,USM from the detection unit 1 are subjected to logarithmic arithmetic operation at a logarithmic amplifier 7 so that they are converted into densities. At a basic masking (BM) 8, color components C,M,Y (basic color components) are separated and the black component K is also separated.

Namely, in the picture producing system according to the present invention, from the color original image 5, which is an object for reproduction or duplication (e.g., a color print, a printed color matter, or the like), image information is detected with respect to each color (R, G or B) at the detection unit 1 by a usual method, namely, by an image information reading system composed of a photomultiplier, a solid-state image pick-up device (CCD) or the like. The image information is then subjected to color separation in the color separation unit 2. Density information values ($D_n$) are therefore obtained for the production of a reproduced color image. These values are obtained with respect to each color component (basic color component) C, M or Y as described above.

In the present invention, needless to say, the above density information values ($D_n$) are converted to image information values ($x_n$) correlated to light quantities and further to basic light quantities (x), using the characteristic curve of a recording medium system, for example, the photoelectric conversion characteristic curve of a CCD as a recording medium. To obtain the image information values ($x_n$) correlated to the light quantities, the conversion can be conducted using appropriate known software and hardware (not shown).

In the present invention, the functions of determining the image information values ($x_n$) correlated to light quantities and the basic light quantities (x) from the density information values ($D_n$) can be incorporated in the gradation adjusting unit 3 which will be described next. This is based on the concept of to combining the calculating functions into a single unit of hardware, because the gradation adjusting unit 3 applies the algorithm of the tonal conversion formula and the above-described image information values ($x_n$) correlated to light quantities are also obtained under the specific algorithm. Needless to say, the present invention is not limited to this design.

A color collection unit (CC) 9 is shown as an element of the color separation unit 2 in FIG. 4. At this color collection unit, the C component, the M component and the Y component are controlled relative to the individual colors of the original R,G,B and C,M,Y. Further, the K component of the original is processed by UCR (under color removal) or UCA (under color addition) of a UCR/UCA unit 10 to determine a proportion to be expressed by three inks C,M,Y and the remaining proportion to be expressed by black ink K.

The components C,M,Y,K, which have been converted to image information values correlated to light quantities, are converted to pixel densities (halftone intensities in pixel blocks of the individual color components, namely, ce', me', ye' and ke' indicating effective area percents of the individual color components at the tonal conversion unit 11.

The tonal conversion unit 11 has an algorithm for determining light quantities ($x_n$) from densities ($D_n$) by using the characteristic curve of the recording medium, on which the color original image is recorded, and calculation algorithms of the tonal conversion formulas. By applying the tonal conversion formulas to C, M, Y, and K, respectively, the effective area percents ce', me',ye',ke' of the individual color components are determined.

The tonal conversion unit 11 can take various forms such as general-purpose computer which holds algorithms of the tonal conversion formulas as software and which also has an interface for A/D and D/A conversion. The tonal conversion unit 11 can also be an embodied an electrical circuit embodying the algorithms as a logic by a general-purpose IC; an electric circuit containing a ROM with the results of algorithmic processing held therein, and a PAL, gate array, or custom IC, embodying the algorithm as an internal logic.

The effective are percents corresponding to the pixel densities (halftone intensities) of the respective color components obtained by the tonal conversion unit 11 are inputted in a color channel selector (CHS) 12, which in turn successively outputs ce', me', ye' and ke' at the time of selection. These outputs are subjected to A/D conversion by an A/D conversion unit 13 and the resulting digital signals are inputted to the output unit 4. Namely, the digital signals are inputted to a dot control (D/C) unit 14 in groups depending on their colors. The dot control (D/C) unit 14 controls the value of each output from a laser beam generator 15.

It was next ascertained whether or not the tonal conversion unit (11) as a core element in the picture producing system according to the present invention (see FIG. 4) is provided with ability to adjust a gradation and color tone of a reproduced color image in combination. To confirm especially if adjustment of a color tone can be rationally performed while maintaining a color graduation, a basic experiment and an application experiment were both conducted in the above-described manner.

Incidentally, the basic experiment was conducted only through the color plates (C/M/Y plates) and the BL (K) plate was not used.

The results of the basic experiment and the application experiment, here were similar to those obtained in the basic experiment and application experiment discussed above.

EXAMPLE 3

Figure 5:
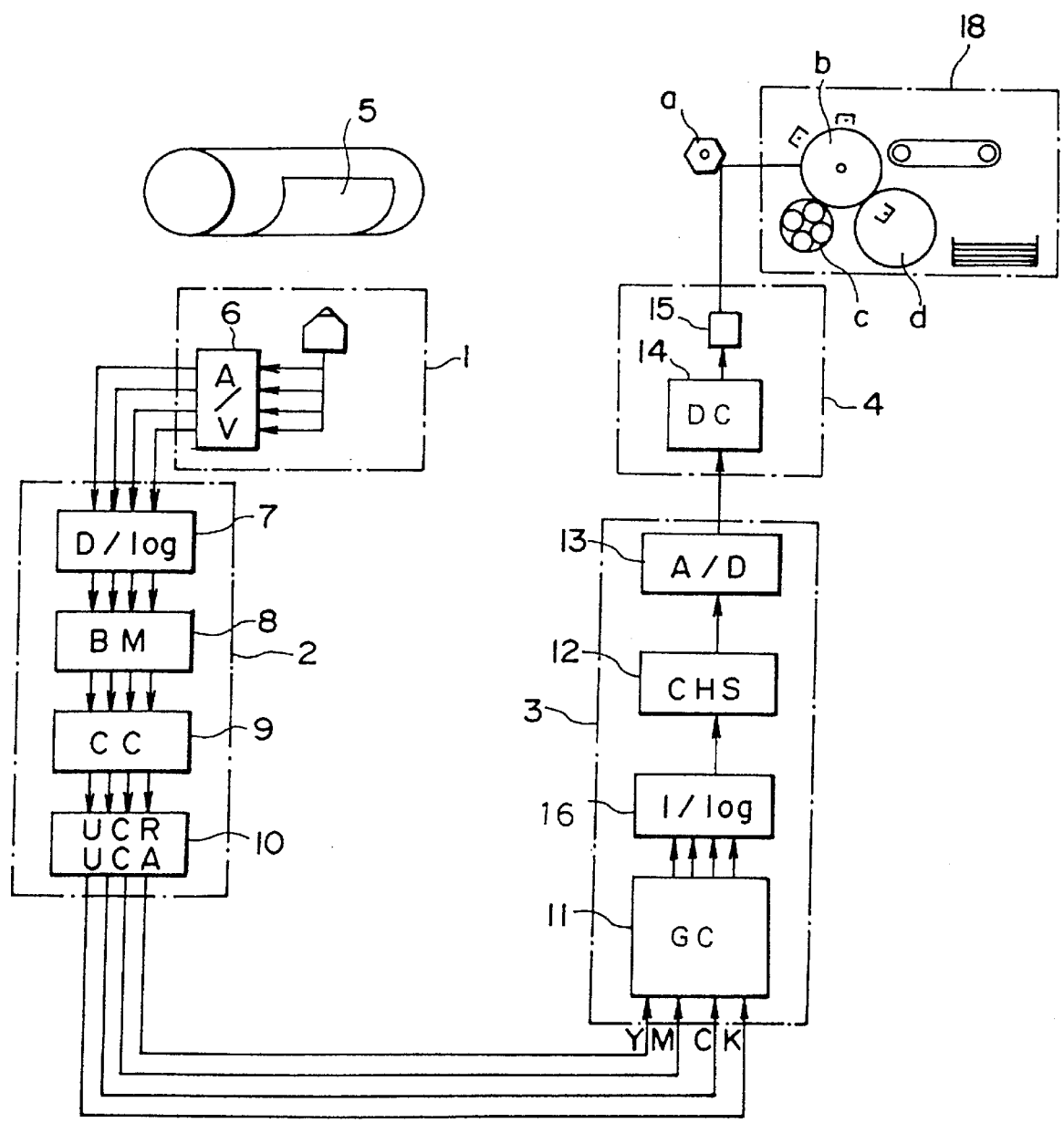
FIG. 5 is a block diagram of a picture producing system according to a second embodiment of the present invention.

The picture producing system according to the second embodiment of the present invention will be described with reference to FIG. 5.

The picture producing system according to the second embodiment uses a conventional inverse logarithmic conversion unit 16 as is. Accordingly, at the tonal conversion unit 11, ye', me', ce' and ke' are outputted in a logarithmic form. By making fewer changes to the hardware construction of the conventional picture producing system than the above-described first embodiment, the second embodiment can modify the existing system into the picture producing system according to the present invention.

EXAMPLE 4

Figure 6:
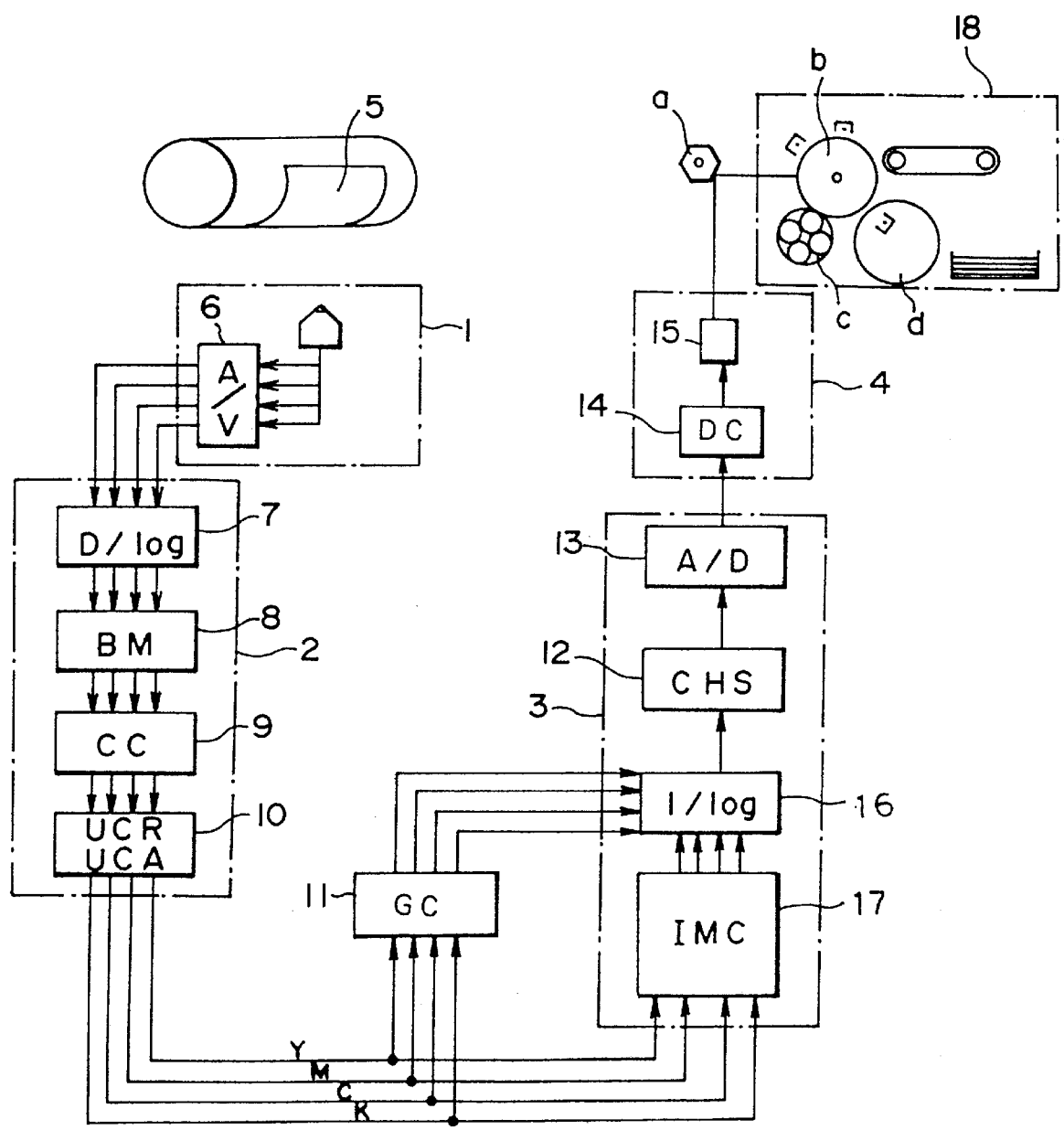
FIG. 6 is a block diagram of a picture producing system according to a third embodiment of the present invention.

The picture producing system according to the third embodiment of the present invention will be described with reference to FIG. 6.

The picture producing system according to the third embodiment has been constructed by retaining a conventional gradation control (IMC) 17 as is, arranging, in addition to channels for connecting the inverse logarithmic conversion unit 16 and the gradation control unit 17 with each other, the tonal conversion unit 11, which receives signals Y,M,C,K, before the gradation control unit 17, and providing the tonal conversion unit 11 with channels for connecting the tonal conversion unit 11 to the inverse logarithmic conversion unit 16.

The tonal conversion unit 11 outputs ye', me', ce' and ke' in a logarithmic form as in the second embodiment.

The picture producing system according to the third embodiment has gradation adjusting functions applied in the conventional system, because the gradation adjusting unit of the conventional system, namely, the gradation control (IMS) unit 17 has been retained.

The tonal conversion unit 11 according to the present invention can make the conventional gradation control unit 17 unnecessary but depending on the customer's need or the like, the gradation control unit 17 can be retained as described above.

EXAMPLE 5

Figure 7:
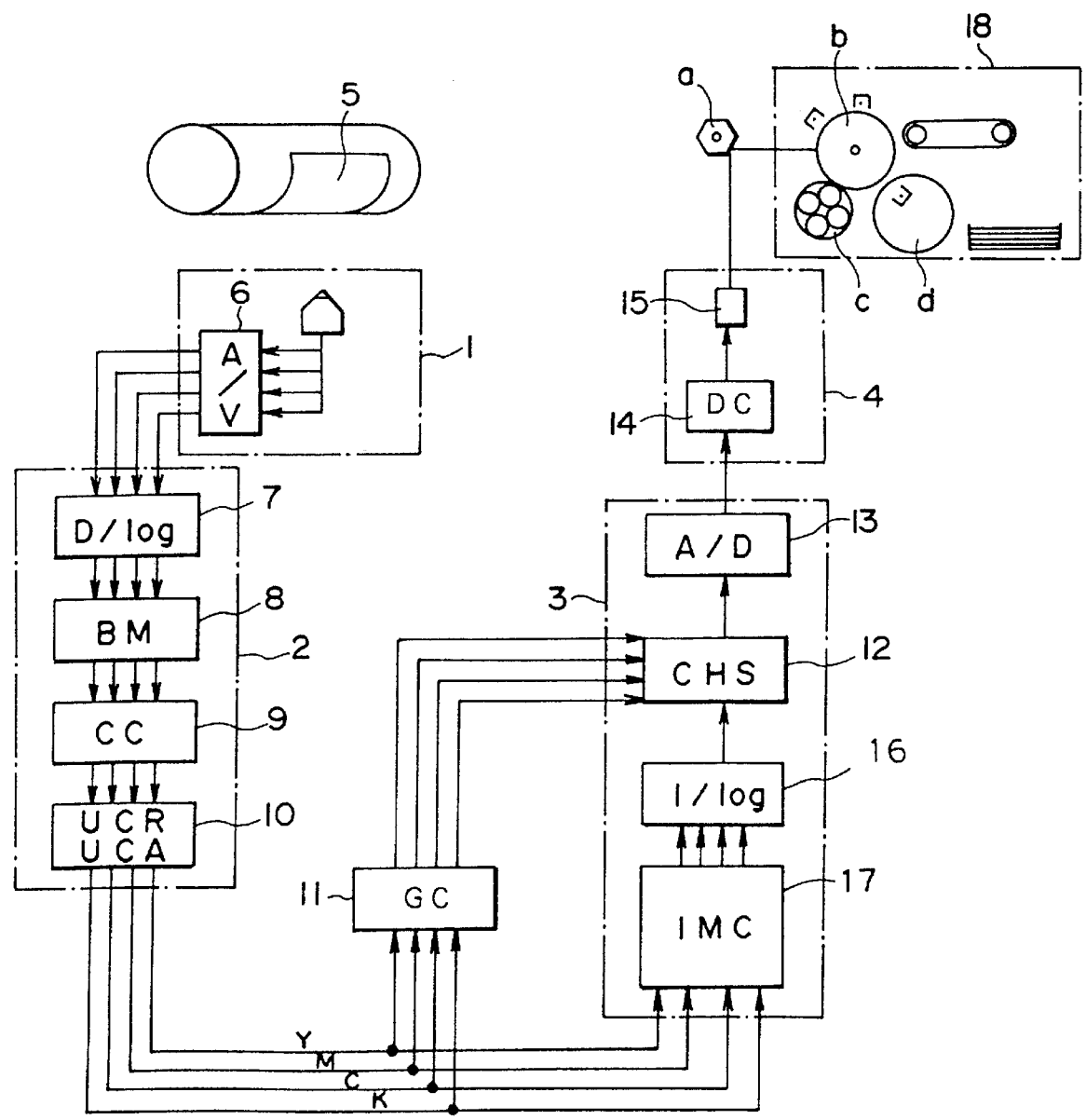
FIG. 7 is a block diagram of a picture producing system according to a fourth embodiment of the present invention.

The picture producing system according to the fourth embodiment of the present invention will be described with reference to FIG. 7.

The picture producing system according to the fourth embodiment has been constructed by adding channels for connecting the gradation control unit (IMC) 17, the inverse logarithmic conversion unit 16 and the color channel selector 12 together and also newly arranging the tonal conversion unit 11 according to the present invention. Namely, the tonal conversion unit 11 receives signals Y,M,C,K from nodes located before the gradation control unit 17 and is connected directly to the color channel selector 12. Without being restrained by the conventional system, ye', me', ce' and ke' can be obtained in a similar processing manner as the tonal conversion unit in the first embodiment. Like the third embodiment, the color producing system can be embodied by making only small improvements to the conventional system.

EXAMPLE 6

Figure 8:
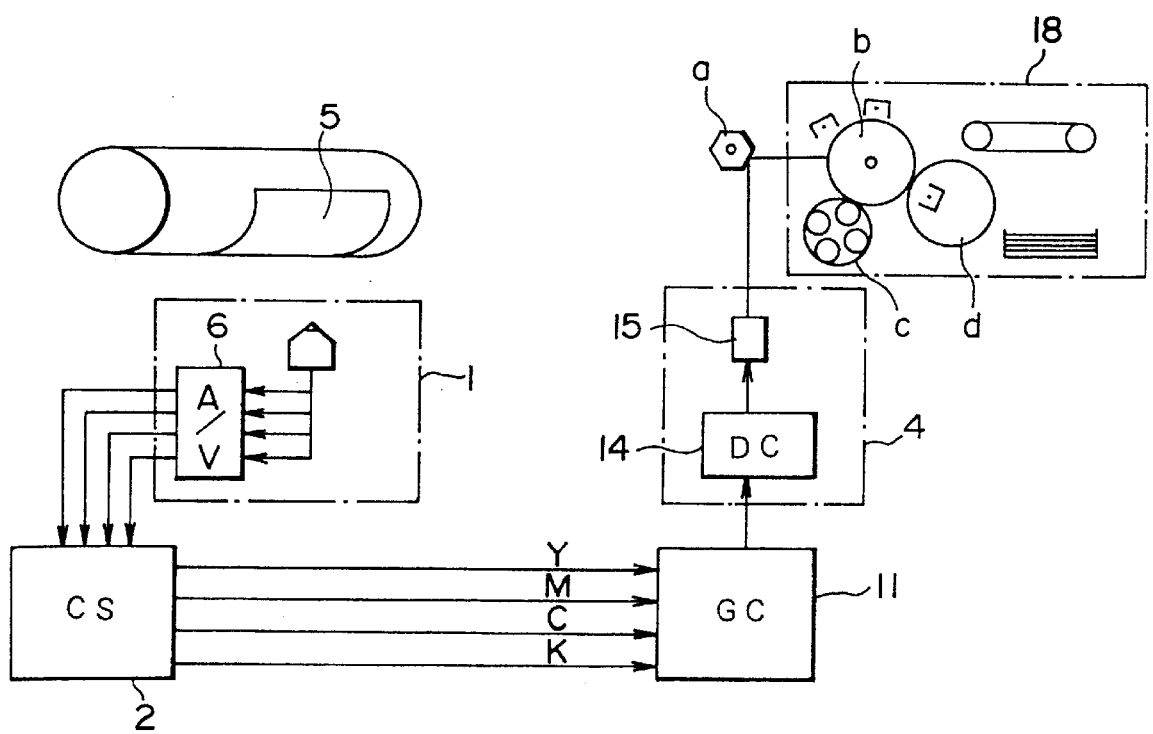
FIG. 8 is a block diagram of a picture producing system according to a fifth embodiment of the present invention.

The picture producing system according to the fifth embodiment of the present invention will be described with reference to FIG. 8.

The picture producing system according to the fifth embodiment has been obtained by constructing the conventional tonal conversion unit in its entirety as the tonal conversion unit 11 according to the present invention and the tonal conversion unit 11 performs conversion of a gradation and adjustment or control of the gradation and a color tone by applying the above-described tonal conversion formulas.

In each of the embodiments of the picture producing system shown in FIG. 4 through FIG. 8, the picture producing unit is of the electrophotographic type that forms an electrostatic latent image on a sensitive body having photoconductivity by scanning it with a laser beam.

Needless to say, as means for forming an image by a distribution of pixels, various means including other means, for example, means of the electrostatic recording type and means of the magnetic recording type, can be adopted.

Figure 9:
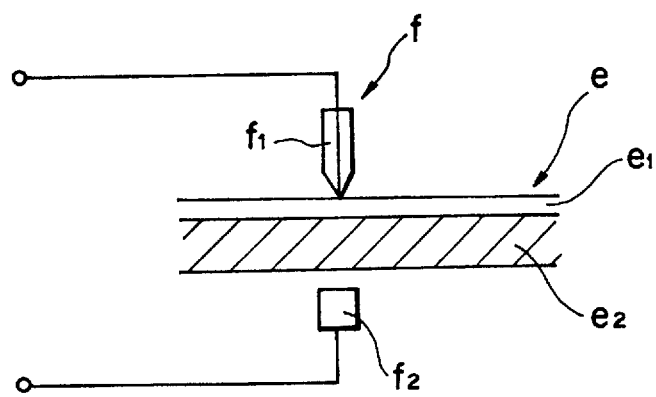
FIG. 9 is a schematic illustration of a picture producing unit according to an electrostatic recording system.

FIG. 9 illustrates a system for forming a reproduced image by the electrostatic recording method.

As is shown in the drawing, at a recording head f, which is constructed by arranging a number of recording electrodes $f_1$ and opposing electrodes $f_2$ in the proximity of or in contact with a moving recording body e made of a sheet-like dielectric and in a direction perpendicular to the moving direction of the recording body, a voltage is selectively applied to the recording electrodes $f_1$ to form a latent electrostatic image. The step of applying toner to the latent image to develop the same and its subsequent steps are similar to the corresponding steps in the electrophotographic type. Incidentally, the recording body e is formed of a recording layer (a dielectric) $e_1$ and a base layer (a low-resistance material) $e_2$ as is illustrated in the drawing.

To the recording head f as an electrode assembly, outputs (voltages) are applied corresponding to an image to be recorded from a dot control unit 14 of the output unit 4.

In an unillustrated picture producing unit of the magnetic recording type, there is used as a recording body, for example, a drum whose surface is uniformly coated with a magnetic material. A magnetic recording head, which is maintained in contact with the surface, and the opposing recording surface are caused to undergo relative movement while applying voltages as image information signals to the magnetic recording head, whereby a latent magnetic image is formed on the opposing recording surface. Toner made of a magnetic material is used to develop this latent image. The other picture reproduction processes are similar to their corresponding processes in the above-described electrophotographic type.

When the gradation adjusting unit of a conventional picture producing system is modified in accordance with the present invention as described above, an application of the tonal conversion formula can be performed in combination with image processing. Owing to optimization of the system, it is possible to achieve a speed-up and a dimensional reduction and also to improve the cost performance per system.

We claim:

1. A method for the control or adjustment of a color tone of pixels of a color plate during production of a reproduced color image by tonal conversion of a light quantity of each pixel of a color original image into a halftone, the light quantity of each pixel having been obtained from the color original image recorded on a predetermined recording medium based on a characteristic curve of the recording medium, the characteristic curve being a correlation curve between light quantities which have entered the recording medium and corresponding densities formed on the recording medium, wherein said method comprises the following steps:

i) setting, at a desired position between a highlight area and a shadow area in the color original image, a color tone control point $M_1$ for controlling the color tone of the reproduced color image;

ii) defining color tone adjustment conditions at the color tone control point $M_1$ in terms of dot percent values of desired plural individual color plates to be employed for the production of the reproduced color image;

iii) introducing, into a tonal conversion formula, (a) a light quantity at the color tone control point $M_1$ from the color original image, (b) the dot percent values of the individual color plates and (c) desired dot percent values set in advance for highlight areas and shadow areas of the individual color plates, to determine values γ for the individual color plates so as to provide respective tonal conversion formulas for the individual color plates for converting, into dot percent values, light quantities of all pixels ranging from the highlight areas to the shadow areas of the individual color plates; and iv) subjecting light quantities from the color original image corresponding to individual pixels of the respective color plates to tonal conversion based on the respective tonal conversion formulas for the individual color plates and controlling or adjusting color tones of the individual pixels of the individual color plates based on the respective tonal conversion formulas for the individual color plates;

wherein the tonal conversion formula is represented as follows, $$y_n - y_H = [\alpha(1-10^{-kx})(y_S-y_H)/(\alpha-\beta)]$$

where x: $(x_n - x_H)$, a base light quantity obtained by subtracting a light quantity $(x_H)$, which corresponds to a density information value $(D_H)$ of the highlight area of the color original image as determined using the characteristic curve of the recording medium, from a light quantity $(x_n)$ corresponding to a density information value $(D_n)$ of a desired pixel point (point: n) on the color original image as determined using the characteristic curve of the recording medium;

$y_n$: a dot percent value set for a pixel on the reproduced color image, the pixel corresponding to the desired pixel point (point: n) on the color original image;

$y_H$: a dot percent value set in advance for the highlight area on the reproduced color image corresponding to the highlight area on the color original image;

$y_S$: a dot percent value set in advance for the shadow area on the reproduced color image corresponding to the shadow area on the color original image;

α: a surface reflectivity of an image expressing medium for recording the reproduced color image;

β: value determined by $\beta=10^{-\gamma}$;

κ: a value determined by $\kappa=\gamma/(x_S-x_H)$ in which $x_S$ represents a light quantity corresponding to a density information value ($D_S$) of the shadow area of the color original image determined by using the characteristic curve of the recording medium; and γ: a desired coefficient.

2. The method according to claim 1, wherein the color original image is a color film original.

3. The method according to claim 2, wherein the characteristic curve of the recording medium of the color film original is a photographic density characteristic curve defined by a rectangular coordinate system in which densities and exposures are plotted along the ordinate and the abscissa, respectively.

4. The method according to claim 1, wherein the plural color plates consist of a cyan plate, a magenta plate, a yellow plate and a black plate, and said adjustment of the color tone is conducted by adjusting the dot percent values of the cyan plate and magenta plate while fixing the dot percent values of the yellow plate and black plate.

5. The method according to claim 1, wherein the color tone control point $M_1$ is set at a position where a dot percent value is 50% on a tonal conversion curve for a cyan plate, the tonal conversion curve having been determined under the following initial conditions: $x_S-x_H=1.0$, $y_H=0\%$, $y_S=95\%$ and $\gamma=0.45$.

6. The method according to claim 5, wherein the color tone control point $M_1$ is set at a position where a normalized light quantity is 0.400.

7. The method according to claim 1, wherein the plural color plates include at least a cyan plate.

8. A picture producing system for producing a reproduced color image of a halftone on a desired image expressing medium by subjecting pictorial information of a color original image having a continuous tone to tonal conversion at a tonal conversion unit of said picture producing system, characterized in that said tonal conversion unit comprises:

a tonal conversion system for converting a continuous tone to a halftone, and for determining a light quantity (value: x) from a density (value: D) by using a characteristic curve of a recording medium on which the color original image is recorded, the characteristic curve defining, by a D-x rectangular coordinate system, a relationship between light quantities which have entered the recording medium and corresponding densities formed on the recording medium, and for performing tonal conversion of the light quantity (value: x) by using a tonal conversion formula so as to determine a halftone intensity (value: $y_n$); and a color tone adjusting system for adjusting a color tone upon said performing of tonal conversion, and for enabling (i) a color tone control point $M_1$ for controlling the color tone of the reproduced color image to be set at a desired position between a highlight area and a shadow area in the color original image, (ii) adjustment conditions for a color tone at the color tone control point $M_1$ to be set in terms of halftone intensities of desired plural color plates which are to be employed for the production of the reproduced color image and (iii) halftone intensities, which are to be set in advance for highlight areas and shadow areas of the color plates, to be set, and for introducing, into the tonal conversion formula, (a) a light quantity at the color tone control point $M_1$, (b) the halftone intensities of the individual color plates and (c) desired halftone intensities to be set in advance for the highlight areas and shadow areas of the individual color plates, to determine values γ for the individual color plates so as to provide respective tonal conversion formulas for the individual color plates for converting, into halftone intensities, light quantities of all pixels ranging from the highlight areas to shadow areas in the individual color plates, and for subjecting light quantities, obtained from the color original image and corresponding to individual pixels of the respective color plates, to tonal conversion based on the respective tonal conversion formulas for the individual color plates and controlling or adjusting color tones of the individual pixels of the individual color plates, based on the respective tonal conversion formulas for the individual color plates; wherein the tonal conversion formula is represented as follows, $$y_n = y_H + [\alpha(1-10^{-\kappa x})\,(y_S-y_H)/(\alpha-\beta)]$$

where x: $(x_n-x_H)$, a base light quantity obtained by subtracting a light quantity $(x_H)$, which corresponds to a density information value $(D_H)$ of the highlight area of the color original image as determined using the characteristic curve of the recording medium, from a light quantity $(x_n)$ corresponding to a density information value $(D_n)$ of a desired pixel point (point: n) on the color original image as determined using the characteristic curve of the recording medium;

$y_n$: a halftone intensity set for a pixel on the reproduced color image, the pixel corresponding to the desired pixel point (point: n) on the color original image;

$y_H$: a halftone intensity set in advance for the highlight area on the reproduced color image corresponding to the highlight area on the color original image;

$y_S$: a halftone intensity set in advance for the shadow area on the reproduced color image corresponding to the shadow area on the color original image;

α: a surface reflectivity of an image expressing medium for recording the reproduced color image;

β: a value determined by $\beta=10^{-\gamma}$;

κ: a value determined by $\kappa=\gamma/(x_S-x_H)$, in which $x_S$ represents a light quantity corresponding to a density information value $(D_S)$ of the shadow area of the color original image determined by using the characteristic curve of the recording medium; and γ: a desired coefficient.

9. The picture producing system according to claim 8, wherein the color original image has been recorded on photoelectric conversion devices as the recording medium.

10. The picture producing system according to claim 9, wherein the characteristic curve of the recording medium is a photoelectric conversion characteristic curve which defines a relationship between light quantities (values: x) which have entered the photoelectric conversion devices and corresponding densities (values: D) formed thereon.

11. The picture producing system according to claim 8, wherein the color original picture has been recorded on a photosensitive material as the recording medium.

12. The picture producing system according to claim 11, wherein the characteristic curve of the recording medium is a photographic density characteristic curve which defines a relationship between light quantities (values: x) which have entered the photosensitive material and corresponding densities (values: D) formed thereon.

13. The picture producing system according to claim 8, wherein the color original image is a color-print original picture.

14. The picture producing system according to claim 13, wherein a characteristic curve of the color-print original picture has been defined with a 1:1 relationship between each light quantity (value: x) and its corresponding density (value: D).

15. The picture producing system according to claim 8, wherein the image expressing medium is a recording sheet; and to produce the reproduced color image on the recording sheet, said picture producing system further comprises transferring means for forming a latent image indicative of a distribution of pixels on an image forming member by scanning with a laser beam the image-forming member which has an evenly-charged photoconductive layer, for developing the latent image with toner, for transferring a resulting toner image onto the recording sheet, and for fixing the toner image on the recording sheet.

16. The picture producing system of claim 15, wherein said transferring means is operable to perform said forming of a latent image, said developing of the latent image, and said transferring of the resulting toner image for a specific color by using a toner of the specific color during said developing of the latent image, said transferring means is further operable to repeat said forming, developing, and transferring for another color by using a toner of the another color during said developing, and said transferring means is further operable to repeat said forming, developing, and transferring a plurality of times for a plurality of colors, respectively, so as to form a corresponding plurality of toner images on the recording sheet and to fix the plurality of toner images to form a color image.

17. The picture producing system according to claim 8, wherein the image expressing medium is a recording sheet; and to produce the reproduced color image on the recording sheet, said picture producing system further comprises transferring means for applying a voltage to a multiplicity of recording electrodes arranged in a direction perpendicular to a direction of movement of a moving electrostatic recording member to form thereon an electrostatic latent image, for developing the latent image with toner, for transferring a resulting toner image onto the recording sheet, and for fixing the toner image on the recording sheet.

18. The picture producing system of claim 17, wherein said transferring means is operable to perform said forming of a latent image, said developing of the latent image, and said transferring of the resulting toner image for a specific color by using a toner of the specific color during said developing of the latent image, said transferring means is further operable to repeat said forming, developing, and transferring for another color by using a toner of the another color during said developing, and said transferring means is further operable to repeat said forming, developing, and transferring a plurality of times for a plurality of colors, respectively, so as to form a corresponding plurality of toner images on the recording sheet and to fix the plurality of toner images to form a color image.

19. The picture producing system according to claim 8, wherein the plural color plates includes at least a cyan plate.

20. A tonal conversion unit for use in a picture producing system for producing a reproduced color image of a halftone on a desired image expressing medium by subjecting pictorial information of a color original image having a continuous tone to tonal conversion at said tonal conversion unit of the picture producing system, characterized in that said tonal conversion unit comprises:

a tonal conversion system for converting a continuous tone to a halftone, and for determining a light quantity (value: x) from a density (value: D) by using a characteristic curve of a recording medium on which the color original image is recorded, the characteristic curve defining, by a D-x rectangular coordinate system, a relationship between light quantities which have entered the recording medium and corresponding densities formed on the recording medium, and for performing tonal conversion of the light quantity (value: x) by using a tonal conversion formula so as to determine a halftone intensity (value: $y_n$); and a color tone adjusting system for adjusting a color tone upon said performing of tonal conversion, and for enabling (i) a color tone control point $M_1$ for controlling the color tone of the reproduced color image to be set at a desired position between a highlight area and a shadow area in the color original image, (ii) adjustment conditions for a color tone at the color tone control point $M_1$ to be set in terms of halftone intensities of desired plural color plates which are to be employed for the production of the reproduced color image and (iii) halftone intensities, which are to be set in advance for highlight areas and shadow areas of the color plates, to be set, and for introducing, into the tonal conversion formula, (a) a light quantity at the color tone control point $M_1$, (b) the halftone intensities of the individual color plates and (c) desired halftone intensities to be set in advance for the highlight areas and shadow areas of the individual color plates, to determine values γ for the individual color plates so as to provide respective tonal conversion formulas for the individual color plates for converting, into halftone intensities, light quantities of all pixels ranging from the highlight areas to shadow areas in the individual color plates, and for subjecting light quantities, obtained from the color original image and corresponding to individual pixels of the respective color plates, to tonal conversion based on the respective tonal conversion formulas for the individual color plates and controlling or adjusting color tones of the individual pixels of the individual color plates, based on the respective tonal conversion formulas for the individual color plates; wherein the tonal conversion formula is represented as follows, $$y_n = y_H + [\alpha(1-10^{-kx})(y_S - y_H)/(\alpha - \beta)]$$

where x: $(x_n - x_H)$, a base light quantity obtained by subtracting a light quantity $(x_H)$, which corresponds to a density information value $(D_H)$ of the highlight area of the color original image as determined using the characteristic curve of the recording medium, from a light quantity $(x_n)$ corresponding to a density information value $(D_n)$ of a desired pixel point (point: n) on the color original image as determined using the characteristic curve of the recording medium;

$y_n$: a halftone intensity set for a pixel on the reproduced color image, the pixel corresponding to the desired pixel point (point: n) on the color original image;

$y_H$: a halftone intensity set in advance for the highlight area on the reproduced color image corresponding to the highlight area on the color original image;

$y_S$: a halftone intensity set in advance for the shadow area on the reproduced color image corresponding to the shadow area on the color original image;

$\alpha$: a surface reflectivity of an image expressing medium for recording the reproduced color image;

$\beta$: a value determined by $\beta=10^{-\gamma}$;

$\kappa$: a value determined by $\kappa=\gamma/(x_S-x_H)$, in which $x_S$ represents a light quantity corresponding to a density information value ($D_S$) of the shadow area of the color original image determined by using the characteristic curve of the recording medium; and $\gamma$: a desired coefficient.

* * * * *